US012699505B2

(12) United States Patent
Hadfield et al.

(10) Patent No.: US 12,699,505 B2
(45) Date of Patent: Aug. 4, 2026

(54) SYSTEMS AND METHODS FOR EDITING DESIGNS

(71) Applicant: Canva Pty Ltd, Surry Hills (AU)

(72) Inventors: Lucas Alexander Hadfield, Sydney (AU); Reuben Lloyd Van Ammers, Melbourne (AU); Danial Khosravi Bachehmir, Dee Why (AU)

(73) Assignee: Canva Pty Ltd, Surry Hills (AU)

( * ) Notice: Subject to any disclaimer, the term of this patent is extended or adjusted under 35 U.S.C. 154(b) by 0 days.

(21) Appl. No.: 19/236,958

(22) Filed: Jun. 12, 2025

(65) Prior Publication Data

US 2026/0169618 A1 Jun. 18, 2026

(30) Foreign Application Priority Data

Dec. 12, 2024 (AU) ................................ 2024278326

(51) Int. Cl.
*G06F 3/04845* (2022.01)
*G06F 8/33* (2018.01)
*G06T 11/60* (2026.01)

(52) U.S. Cl.
CPC ............ *G06F 3/04845* (2013.01); *G06F 8/33* (2013.01); *G06T 11/60* (2013.01)

(58) Field of Classification Search
CPC ...... G06F 3/04845; G06F 3/0484; G06F 8/33; G06F 8/30; G06T 11/60
USPC ........................................................ 715/764
See application file for complete search history.

(56) References Cited

U.S. PATENT DOCUMENTS

| | | | | |
|---|---|---|---|---|
| 10,074,200 B1 * | 9/2018 | Yeturu | ................. | G06F 40/169 |
| 10,579,737 B2 * | 3/2020 | Brixey | ................. | G06F 40/169 |
| 11,995,394 B1 * | 5/2024 | Morariu | ................. | G06N 3/045 |
| 12,142,298 B1 * | 11/2024 | Kottur | .................... | G06F 40/35 |
| 2003/0133022 A1 * | 7/2003 | Melton | ................ | G11B 27/034 |
| | | | | 386/E5.067 |

(Continued)

FOREIGN PATENT DOCUMENTS

WO WO-2025259079 A1 * 12/2025 ............. G06V 10/82

OTHER PUBLICATIONS

Wang et al., "Towards Natural Language-Based Visualization Authoring", IEEE Transactions on Visualization and Computer Graphics, vol. 29, No. 1, Jan. 2023, pp. 1222-1232. (Year: 2023).*

(Continued)

*Primary Examiner* — Hwei-Min Lu
(74) *Attorney, Agent, or Firm* — GrowIP Law Group LLC

(57) ABSTRACT

Described herein is a computer implemented method for automatically editing a digital design in a design application. The method includes receiving a natural language request to edit the digital design; and accessing a native format representation of the digital design. The native format representation includes one or more native design elements. The method further includes generating a descriptive format representation of the digital design by converting at least one of the one or more native design elements into a descriptive design element; generating at least one descriptive edit action based on the request and the descriptive format representation of the digital design; converting the at least one descriptive edit action into a native edit action; and implementing the native edit action, in the design application, to update the digital design.

20 Claims, 10 Drawing Sheets

(56) References Cited

U.S. PATENT DOCUMENTS

| | | | | |
|---|---|---|---|---|
| 2013/0204610 A1* | 8/2013 | Wu | ................... | G06F 40/58 |
| | | | | 704/9 |
| 2014/0078075 A1* | 3/2014 | Wilensky | ........... | G06F 3/04883 |
| | | | | 345/173 |
| 2016/0321242 A1* | 11/2016 | Wilensky | ............. | G06F 40/186 |
| 2017/0263248 A1* | 9/2017 | Gruber | ................ | G06F 40/166 |
| 2018/0349108 A1* | 12/2018 | Brebner | ................. | H04W 4/80 |
| 2019/0087398 A1* | 3/2019 | Kolesov | ............... | G06F 40/174 |
| 2020/0066261 A1* | 2/2020 | Ganz | ..................... | G06F 40/30 |
| 2020/0151277 A1* | 5/2020 | Fisher | ................. | G06F 40/284 |
| 2022/0067992 A1* | 3/2022 | Xu | ........................ | G10L 15/22 |
| 2022/0076668 A1* | 3/2022 | Carbune | ............... | G06F 40/30 |
| 2023/0126177 A1* | 4/2023 | Xu | ........................ | G06T 5/77 |
| | | | | 382/275 |
| 2023/0305690 A1* | 9/2023 | Brdiczka | ............. | G06F 3/0482 |
| 2023/0409298 A1* | 12/2023 | Ciminelli | ................. | G06F 8/38 |
| 2024/0386197 A1* | 11/2024 | Perez | ................... | G06F 16/958 |
| 2024/0427832 A1* | 12/2024 | Ronen | ................ | G06F 16/9577 |
| 2025/0139579 A1* | 5/2025 | Lu | .......................... | G06F 9/451 |
| 2025/0140005 A1* | 5/2025 | Eyal | ................... | G06F 16/5866 |

OTHER PUBLICATIONS

Duan et al., "Generating Automatic Feedback on UI Mockups with Large Language Models", ARXIV ID: 2403.13139, Mar. 19, 2024, pp. 1-20. (Year: 2024).*

Guo, Y., et al., 'PPTC Benchmark: Evaluating Large Language Models for PowerPoint Task Completion', arXiv, Nov. 3, 2023, https://arxiv.org/pdf/2311.01767v1, [retrieved on Jan. 13, 2025], pp. 1-17.

* cited by examiner

100

500

SYSTEMS AND METHODS FOR EDITING DESIGNS

CROSS-REFERENCE TO RELATED APPLICATION

This application is a U.S. Non-Provisional Application that claims priority to Australian Patent Application No. 2024278326, filed Dec. 12, 2024, which is hereby incorporated by reference in its entirety.

TECHNICAL FIELD

Aspects of the present disclosure are directed to systems and methods for automatically editing digital designs. Some aspects of the present disclosure relate to systems and methods for interfacing design applications with generative artificial intelligence (AI) models.

BACKGROUND

Computer applications for creating and editing digital designs exist. Generally speaking, such applications allow users to create a design by, for example, creating a page and adding design elements such as text and images to that page. The design may be edited by adding, removing and/or updating design elements on the page.

Generative artificial intelligence (AI) models also exist. Generally speaking, such AI models generate text and/or image content in response to text prompts.

However, existing design applications may be ineffective and/or unable to automatically create or edit digital designs, and existing AI models may be ineffective and/or unable to interface with existing design applications.

SUMMARY

Described herein is a computer implemented method for automatically editing a digital design in a design application. The digital design includes one or more individual design elements. The method includes: receiving a natural language request to edit the digital design, wherein editing the digital design includes adding one or more design elements to the digital design, or deleting or modifying one or more of the existing design elements in the digital design; accessing a native format representation of the digital design, the native format representation including one or more native design elements corresponding to the existing one or more design elements; generating a descriptive format representation of the digital design by converting at least one of the one or more native design elements into a descriptive design element; generating at least one descriptive edit action based on the request and the descriptive format representation of the digital design; converting the at least one descriptive edit action into a native edit action, wherein converting the at least one descriptive edit action into the native edit action includes identifying a descriptive action component in the descriptive edit action and generating a native action component based on the descriptive action component; and implementing the native edit action, in the design application, to update the digital design.

Also described herein is a computer processing system including: a processing unit; a communication interface; and a non-transitory computer-readable storage medium storing instructions, which when executed by the processing unit, cause the processing unit to perform the above-described method.

Furthermore, described herein is a non-transitory storage medium storing instructions executable by a processing unit to cause the processing unit to perform the above-described method.

Further methods, computer processing systems and executable instructions will become apparent from the following description, given by way of example only and with reference to the accompanying figures.

Figure 1:
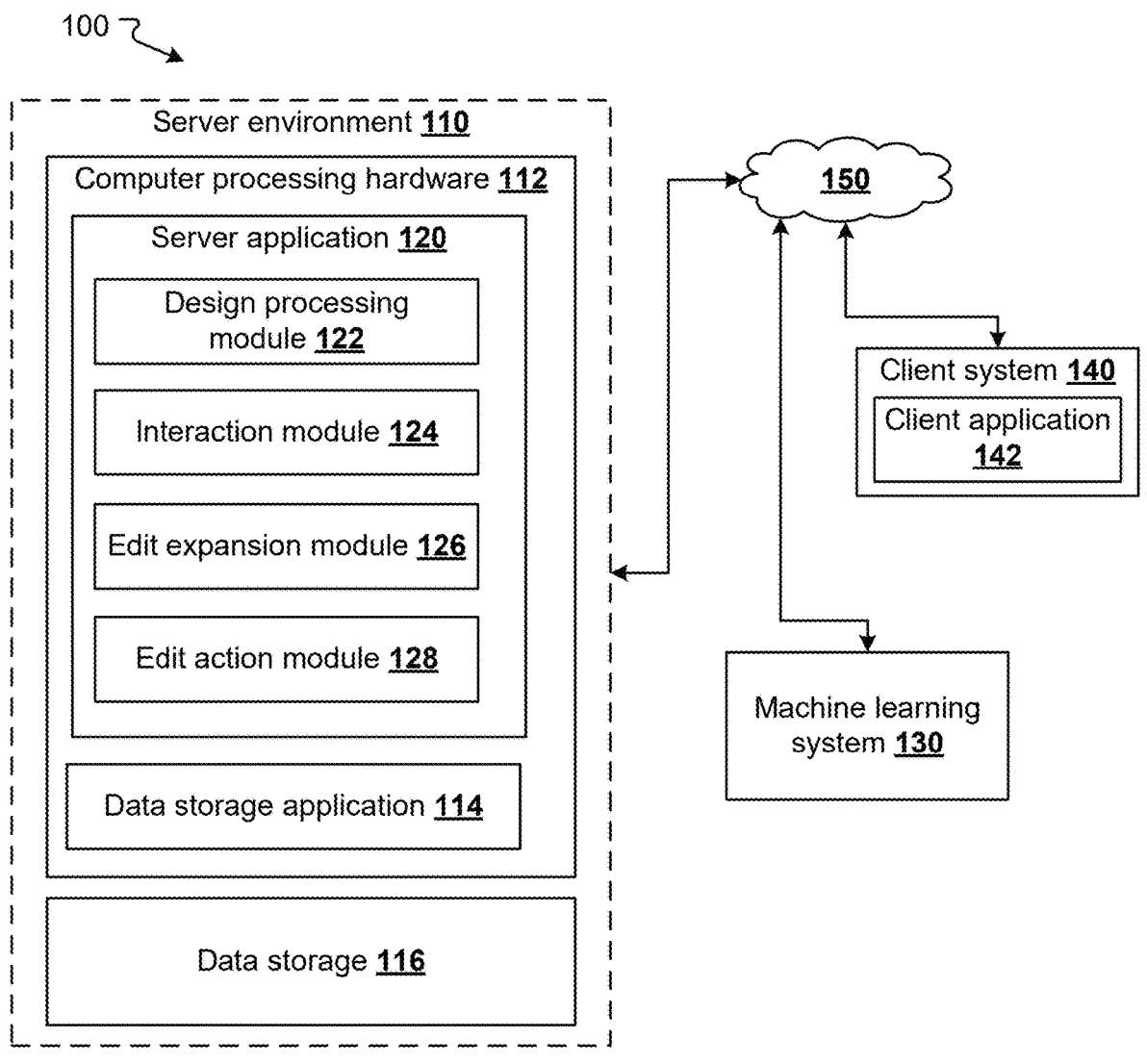
FIG. 1 is a block diagram depicting an example network environment for performing various features of the present disclosure.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present disclosure as defined by the appended claims.

DETAILED DESCRIPTION

In the following description numerous specific details are set forth to provide a thorough understanding of the present disclosure. It will be apparent, however, that the present disclosure may be practiced without these specific details. In some instances, well-known structures and devices are shown in block diagram form to avoid unnecessary obscuring.

As discussed above, computer applications for use in creating and editing digital designs exist. Such applications may provide mechanisms for a user to create a design (e.g., create a page and adding design elements such as text and images to that page), edit the design (e.g., by adding, removing or modifying design elements), and output the design in various ways (e.g. by saving, displaying, printing, publishing, sharing, or otherwise outputting the design). Such applications may offer a wide variety of functionalities and tools to edit designs; and an extensive library of assets to add or apply to designs. Thus, such design applications, functionalities and assets may involve, and require familiarity with, numerous user interfaces of varying complexity. Pre-existing applications and techniques may be ineffective and/or unable to identify the most suitable design element(s) and/or edit action(s). Such pre-existing applications and techniques may make the task of creating or editing a design challenging for users. For example, a user may not be aware of (or familiar with) the various features of the design application and therefore may be unable to utilize the tools for editing to their full potential to achieve a desired result. Further still, even if a user is adept at using a design application and creating designs, pre-existing applications may require the user to perform numerous steps to create and edit a design, including e.g., perusing a plethora of design templates, selecting a design template, and performing several design edits (such as adding, deleting, and updating design elements) to achieve a desired design intent. This can be tedious, result in a number of additional computational steps, and increase the cognitive burden on the user.

Design applications may store designs including various design elements, in a native format to the application, which is a suitable format for managing the design data and implementing various functionalities of the design application. Stored design data is desired to be as efficient as possible to minimise required computer storage. At the same time, native format design data must also be structured in such a way and include sufficient fields and detail to enable the functionalities of the design application (including legacy functionalities and edge cases), and to provide compatibility. Accordingly, design applications, their functionalities and design data formats may be relatively complex.

As also mentioned above, generative AI models also exist. Whilst some such models are able to receive input text prompts and output text and/or media they are generally incompatible with and unable to interface with design applications. AI models often require training and/or finetuning with respect to particular input and output formats as well as particular tasks. For example, an AI such as a large language model (LLM), trained on natural language, may be suitable for processing natural language data but would be unable to suitably process other formats of data. Moreover, the finetuning of a model can be a time consuming and resource intensive task. Accordingly, existing AI models may be unable to process native design data formats and may be unable to interact with designs or interface with design applications.

The inventors of the present disclosure have identified that there exists a need for computer applications that can assist users in creating and editing designs and which can enable a generative AI model to process and interact with the designs and their constituent elements.

Aspects of the present disclosure address one or more of these issues with conventional design generation applications and processes by providing systems and methods for automatically and intelligently editing designs in a design application. In particular the systems and methods are configured to 1) access a native format representation of the design and generate a descriptive format representation of the design by converting one or more native format design elements of the design into corresponding descriptive format design elements; 2) receive a request to edit at least one of the native format design elements of the design; 3) generate a descriptive edit action based on the request and the descriptive format representation of the design; 4) convert the descriptive edit action into a native edit action; and 5)

implement the native edit action to update the design. Advantageously, aspects of the present disclosure may allow a user to edit a design in a conversational manner, implementing a broad range of edit actions via a conversational interface.

Aspects of the present disclosure may communicate with a generative AI model, for example, a machine learning (ML) system to facilitate automatic editing of designs in a conversational manner. In particular the systems and methods provide a natural language request included as (or as part of) a user input message, including a request to edit a design, and a descriptive representation of the design to the ML system and configure the ML system to output descriptive representations of edit actions based on the request and descriptive representation of the design. The systems and methods may then convert the descriptive representations of the edit actions into native edit actions suitable for implementing in a design action to apply the edit requested by the user. Advantageously, aspects of the present disclosure may allow one or more AI models to interact with the user and/or designs, interface with a design application and provide contextual design advice in respect of designs as well as update the designs.

Example Systems

The techniques disclosed herein are described in the context of a digital design platform. The digital design platform is configured to facilitate various operations concerned with (digital) designs and may take various forms. In the context of the present disclosure, the operations of the digital design platform may relevantly include generating, editing, and storing designs. A digital design platform may take various forms. In the embodiments described herein the digital design platform is a client-server type platform (e.g. one or more client applications and one or more server applications that interoperate to perform the described techniques). The techniques described herein can, however, be performed (or be adapted to be performed) by a stand-alone digital design platform (e.g. an application or set of applications that run on a user's computer processing system and perform the techniques described herein without requiring server-side operations).

FIG. 1 shows an example of a computer system, in the form of a client server architecture, and a networked environment 100 in which various features of the present disclosure may be implemented. The networked environment 100 includes a server environment 110, a ML system 130, and a client system 140, which operate together to perform the operations described herein.

The systems 110-140 communicate with one another via one or more communication networks 150 (e.g., the Internet). For example, the client system 140 communicates with the server environment 110 via public internetwork, whereas the server environment 110 may communicate with the ML system 130 via a local or public area network.

The server environment 110 is a system entity that hosts one or more computer applications and/or content. The server environment 110 may include one or more server computing systems or nodes for hosting a server application 120 and one or more storage devices (e.g., data store 116) for storing application specific data. An example of a server application hosted by the server environment 110 includes a digital design application (e.g., Canva designs).

Generally speaking, the server environment 110 includes computer processing hardware (e.g., a server system) 112, on which one or more applications are executed that provide server-side functionality to client applications, and one or more storage devices (e.g., data store 116) for storing data.

In the present example, the computer processing hardware 112 of the server environment 110 runs a server application 120, which may also be referred to as a front end server application, and a data storage application 114. An example of a server application hosted by the server system 112 includes a digital design application (e.g., Canva designs).

The server application 120 operates to provide an endpoint for a client application, for example a client application 142 on the client system 140, which is accessible over communications network 150. To do so, the server application 120 may include one or more application programs, libraries, application programming interfaces (APIs) or other software elements that implement the features and functions that are described herein, including for example to provide automatic editing of a design. By way of example, where the server application 120 serves web browser client applications, the server application 120 will be a web server which receives and responds to, for example, HTTP application protocol requests. Where the server application 120 serves native client applications, the server application 120 will be an application server configured to receive, process, and respond to API calls from those client applications. The server environment 110 may include both web server and application server applications allowing it to interact with both web and native client applications.

While a single server architecture has been described herein, it will be appreciated that the server environment 110 can be implemented using alternative architectures. For example, in certain cases a clustered architecture may be used where multiple server computing instances (or nodes) are instantiated to meet system demand. Communication between the applications and computer processing systems of the server environment 110 may be by direct or networked communication over one or more local, wide area and/or public networks. Conversely, in the case of small enterprises with relatively simple requirements the server environment 110 may be a stand-alone implementation (i.e. a single computer directly accessed/used by the client).

The server application 120, in conjunction with client application 142, facilitates various functions related to digital designs. These may include, for example, design creation, editing, organisation, searching, storage, retrieval, viewing, sharing, publishing, and/or other functions related to digital designs including providing graphical user interfaces for performing such functions. Additionally, the server application 120 may facilitate the conversion of design data between native formats and descriptive formats, and functionalities for the automatic and intelligent editing of designs including, for example, via the machine learning (ML) system 130. The server application 120 may also facilitate additional, related functions such as user account creation and management, user group creation and management, and user group permission management, user authentication, and/or other server side functions.

To perform the functions described herein, the server application 120 includes a number of software modules, which provide various functionalities and interoperate to automatically edit designs. These modules are discussed below and include a design processing module 122, an interaction module 124, an edit expansion module 126, and an edit action module 128.

The design processing module 122 is configured to process design data and convert design representations in a native format, for example native design data, into design representations in a descriptive format, for example, descriptive design data. The design processing module 122 may store and access native and descriptive format design data to and from the data storage 116.

The interaction module 124 is configured to facilitate interaction between a user, a design of the design application, and an AI model. In particular, the interaction module 124 is configured to communicate with the ML system 130, to provide one or more prompts to the ML system 130 and receive one or more outputs from the ML system 130. The inputs may include configuration data and user input text. The outputs may include replies, design comments; change descriptions, edit actions; edit summaries; and/or suggested quick responses. The interaction module 124 may store and access the inputs and outputs, descriptive format design data, configuration data, and conversation data to and from the data storage 116.

The edit expansion module 126 is configured to process edit summaries and expand the edit summaries into a set of edit actions. In particular, the edit expansion module 126 is configured to communicate with the ML system 130, to provide one or more inputs to the ML system 130 and receive one or more outputs from the ML system 130. The inputs may include configuration data and edit summaries. The outputs may include a set of one or more edit descriptions. The edit expansion module 126 may store and access configuration data, edit summaries, and edit actions to and from the data storage 116.

The edit action module 128 is configured to process edit actions and convert edit actions in a descriptive format into edit actions in a native format. The edit action module 128 is also configured to implement edit actions to apply edits and update a design. The edit action module 128 may further detect user inputs, for example selections, to apply edits to a design. The edit action module 128 may store and access native and descriptive edit actions to and from the data storage 116.

The data storage application 114 operates to receive and process requests to persistently store and retrieve data, to and from data storage 116, data that is relevant to the operations performed/services provided by the server environment 110. Such requests may be received from the server application 120, other server environment applications, and/or in some instances directly from client applications such as the client application 142. Data relevant to the operations performed/services provided by the server environment may include, for example, user account data, design data, media item data, edit action data, conversation data and/or other data relevant to the operation of the server application 120. The data storage is provided by one or more data storage devices that are local to or remote from the computer processing hardware 112. The example of FIG. 1 shows data storage 116 in the server environment 110. The data storage 116 may be, for example, one or more non-transitory computer readable storage devices such as hard disks, solid state drives, tape drives, or alternative computer readable storage devices.

The data store 116 stores data relevant to the operations performed/services provided by the server application 120. In particular, it may store user inputs, configuration data, conversation data, native format design data (e.g., design data in a native format), descriptive format design data (e.g., design data in a descriptive format), native edit actions, descriptive edit actions, and/or other data relevant to the operation of the server application 120. Data relevant to the operations performed/services provided by the server application 120 may include, for example, user account data, user design data (i.e. data describing designs that have been created by users), design element data (e.g. data in respect of stock elements and/or machine generated elements that users may add to designs), and/or other data relevant to the operation of the server environment 110. In the server environment 110, the server application 120 persistently stores data to the data storage 116 via the data storage application 114. In alternative implementations, however, the server application 120 may be configured to directly interact with the data storage 116 to store and retrieve data, in which case a separate data storage application may not be needed.

The ML system 130 hosts one or more generative ML models that may be configured to generate outputs based on input prompts. In particular, the ML system 130 may be configured to receive an input prompt (e.g., a design interaction prompt or a design edit expansion prompt) and generate text content for editing a design, commenting in respect of the design, and/or expanding an edit summary based on the input prompt. In some embodiments, the ML system 130 may be a large language model (LLM) that is trained as a general-purpose ML model that can be used to generate different types of text-based outputs. In the present case, if a general-purpose ML model is used, it may additionally be trained and/or configured to perform specific tasks. For example, the general-purpose ML model may be trained to generate text (e.g., descriptions of design edits and/or comments on a design) from a prompt. In other embodiments, the ML model may be a more specific model that is trained to generate the outputs described above.

Whilst, ML system 130 is depicted as a single system, in alternative embodiments, ML system 130 may be implemented as two or more systems each hosting respective ML models. Furthermore, in some examples, the ML system 130 may be associated with and owned by the same party that operates the server environment 110. In this case, the ML system 130 may be part of the server environment 110. In other examples, the ML system(s) 130 may be owned or operated by one or more third parties that are independent to the party that owns or operates the server environment 110. Examples of third party LLMs include OpenAI's ChatGPT4, and Google's Bard.

As noted, the server application 120 and data storage application 114 run on (or are executed by) computer processing hardware 112. The computer processing hardware 112 includes one or more computer processing systems. The precise number and nature of those systems will depend on the architecture of the server environment 110.

For example, in one implementation a single server application 120 runs on its own computer processing system and a single data storage application 114 runs on a separate computer processing system. In another implementation, a single server application 120 and a single data storage application 114 run on a common computer processing system. In yet another implementation, the server environment 110 may include multiple server applications running in parallel on one or multiple computer processing systems.

Communication between the applications and computer processing systems of the server environment 110 may be by any appropriate means, for example direct communication or networked communication over one or more local area networks, wide area networks, and/or public networks (with a secure logical overlay, such as a VPN, if required).

The client system 140 may be any computer processing system which is configured or is configurable to offer client-side functionality. A client system 140 may be a desktop computer, laptop computers, tablet computing device, mobile/smart phone, or other appropriate computer processing system.

The client application 142 may be a general web browser application which accesses the server application 120 via an appropriate uniform resource locator (URL) and communicates with the server application 120 via general worldwide-web protocols (e.g. http, https, ftp). Alternatively, the client application 142 may be a native application programmed to communicate with server application 120 using defined API calls.

The client system 140 hosts the client application 142 which, when executed by the client system 140, configures the client system 140 to provide client-side functionality/interact with server environment 110 or more specifically, the server application 120 and/or other application provided by the server environment 110. Via the client application 142, a user can perform various operations such as creating, viewing and editing designs, and providing user inputs (e.g., requests and/or selections).

The present disclosure describes various operations that are performed by server application 120 and client application 142. However, operations described as being performed by a particular application (e.g. server application 120) could be performed by (or in conjunction with) one or more alternative applications (e.g. client application 142), and/or operations described as being performed by multiple separate applications could in some instances be performed by a single application.

In the present example, server application 120 is configured to perform the functions described herein by execution of a software application (or a set of software applications)—that is, computer readable instructions that are stored in a storage device (such as non-transitory memory 210 described below) and executed by a processing unit of the system 200 (such as processing unit 202 described below). Similarly, client system 140 is configured to perform functions described herein by execution of software application 142 stored in a storage device and executed by a processing unit of a corresponding system.

Example Computer Processing System

The techniques and operations described herein are performed by one or more computer processing systems. By way of example, client system 140 may be any computer processing system which is configured (or configurable) by hardware and/or software—e.g. client application 142—to offer client-side functionality. A client system 140 may be a desktop computer, laptop computer, tablet computing device, mobile/smart phone, or other appropriate computer processing system. Similarly, the server application 120 is also executed by one or more computer processing systems (the computer processing hardware 112).

Figure 2:
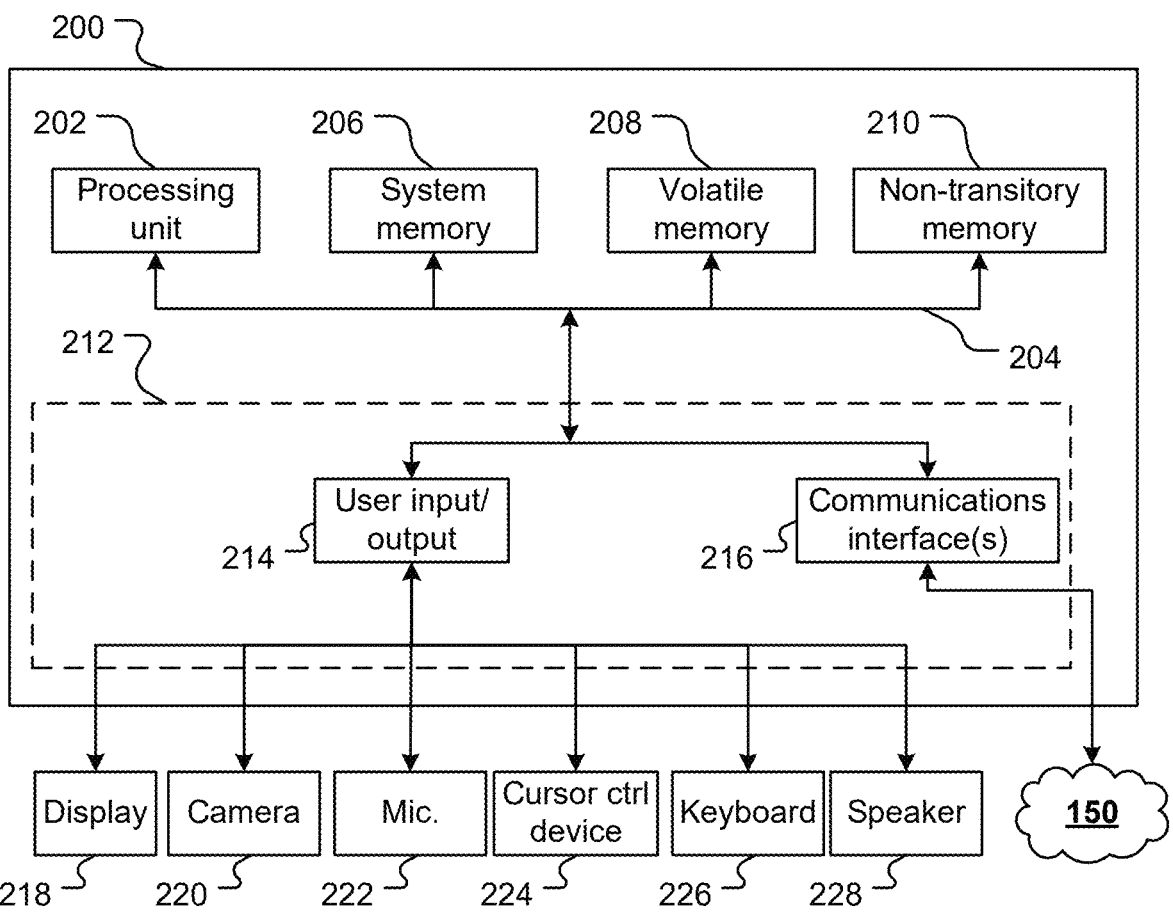
FIG. 2 is a block diagram of a computer processing system.

FIG. 2 provides a block diagram of a computer processing system 200 configurable to implement operations described herein. The computer processing system 200 is a general purpose computer processing system. As such a computer processing system in the form shown in FIG. 2 may, for example, form a standalone computer processing system, form all or part of computer processing hardware 112, including data storage 116, or form all or part of the client system 140 (see FIG. 1). Other general purpose computer processing systems may be utilised in the system of FIG. 1 instead.

It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

The computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to and useable by (either in a shared or dedicated manner) the computer processing system 200.

Through a communications bus 204 the processing unit 202 is in data communication with one or more machine readable storage (memory) devices which store computer readable instructions and/or data which are executed by the processing unit 202 to control operation of the processing system 200. In this example the computer processing system 200 includes a system memory 206 (e.g. a BIOS), volatile memory 208 (e.g. random access memory such as one or more DRAM modules), and non-transitory memory 210 (e.g. one or more hard disk or solid state drives).

The computer processing system 200 also includes one or more interfaces, indicated generally by 212, via which computer processing system 200 interfaces with various devices and/or networks. Generally speaking, other devices may be integral with the computer processing system 200, or may be separate. Where a device is separate from the computer processing system 200, connection between the device and the computer processing system 200 may be via wired or wireless hardware and communication protocols, and may be a direct or an indirect (e.g. networked) connection.

Wired connection with other devices/networks may be by any appropriate standard or proprietary hardware and connectivity protocols. For example, the computer processing system 200 may be configured for wired connection with other devices/communications networks by one or more of: USB; eSATA; Ethernet; HDMI; and/or other wired connections.

Wireless connection with other devices/networks may similarly be by any appropriate standard or proprietary hardware and communications protocols. For example, the computer processing system 200 may be configured for wireless connection with other devices/communications networks using one or more of: BlueTooth®; WiFi®; near field communications (NFC); Global System for Mobile Communications (GSM), and/or other wireless connections.

Generally speaking, and depending on the particular system in question, devices to which the computer processing system 200 connects-whether by wired or wireless means-include one or more input devices to allow data to be input into/received by the computer processing system 200 and one or more output devices to allow data to be output by the computer processing system 200. Example devices are described below, however it will be appreciated that not all computer processing systems will include all mentioned devices, and that additional and alternative devices to those mentioned may well be used.

For example, the computer processing system 200 may include or connect to one or more input devices by which information/data is input into (received by) the computer processing system 200. Such input devices may include keyboard, mouse, trackpad, microphone, accelerometer, proximity sensor, GPS, and/or other input devices. The computer processing system 200 may also include or connect to one or more output devices controlled by the computer processing system 200 to output information. Such output devices may include devices such as a display (e.g. a LCD, LED, touch screen, or other display device), speaker, vibration module, LEDs/other lights, and/or other output devices. The computer processing system 200 may also include or connect to devices which may act as both input and output devices, for example memory devices (hard drives, solid state drives, disk drives, and/or other memory devices) which the computer processing system 200 can read data from and/or write data to, and touch screen displays which can both display (output) data and receive touch signals (input). The user input and output devices are generally represented in FIG. 2 by user input/output 214.

By way of example, where the computer processing system 200 is the client system 140 it may include a display 218 (which may be a touch screen display), a camera device 220, a microphone device 222 (which may be integrated with the camera device), a pointing device 224 (e.g. a mouse, trackpad, or other pointing device), a keyboard 226, and a speaker device 228.

The computer processing system 200 also includes one or more communications interfaces 216 for communication with a network, such as network 150 of environment 100 (and/or a local network within the server environment 110). Via the communications interface(s) 216, the computer processing system 200 can communicate data to and receive data from networked systems and/or devices.

The computer processing system 200 may be any suitable computer processing system, for example, a server computer system, a desktop computer, a laptop computer, a netbook computer, a tablet computing device, a mobile/smart phone, a personal digital assistant, or an alternative computer processing system.

The computer processing system 200 stores or has access to computer applications (also referred to as software or programs)—i.e. computer readable instructions and data which, when executed by the processing unit 202, configure the computer processing system 200 to receive, process, and output data, or in other words to configure the computer processing system 200 to be data processing system with particular functionality. Instructions and data can be stored on non-transitory memory 210. Instructions and data may be transmitted to/received by the computer processing system 200 via a data signal in a transmission channel enabled (for example) by a wired or wireless network connection over an interface, such as communications interface 216.

Typically, one application accessible to the computer processing system 200 will be an operating system application. In addition, the computer processing system 200 will store or have access to applications which, when executed by the processing unit 202, configure system 200 to perform various computer-implemented processing operations described herein. For example, and referring to the networked environment of FIG. 1 above, server environment 110 includes one or more systems which run a server application 120, a data storage application 114. Similarly, client system 130 runs a client application 142.

In some cases part or all of a given computer-implemented method will be performed by the computer processing system 200 itself, while in other cases processing may be performed by other devices in data communication with the computer processing system 200.

Example Data Structures

In the context of the digital design platform, (digital) designs may be stored in the server environment 110 (e.g., in data storage 116) using a representation format native to the server environment 110 and server application 120, for example, a native design data format. As used herein, a native format refers to a format that is native to and/or supported by the server environment 110 and server application 120. Typically, the native design data format will variously cater for all the specific functions of the server application 120 whilst providing a structure that is as efficient as possible. An example native design data format that will be used throughout this disclosure for illustrative purposes will now be described. Alternative native design data formats (which make use of the same or alternative design attributes) are, however, possible, and the processing described herein can be adapted for alternative formats.

In the present context, design data in respect of a particular design is stored in a design record. Generally speaking, a design record defines certain design-level attributes and includes element data. In the present example, the format of each design record is a device independent format including a set of key-value pairs (e.g. a map or dictionary). To assist with understanding, a partial example of a design record format is as follows:

| Attribute | Example |
|---|---|
| Design ID | "abc123" |
| Dimensions | {1080:1080} |
| Design type | "poster" |
| Design name | "Test Doc 3" |
| Background | "mediaID": "M12345"} |
| Element data | [{element 1}, . . . {element n}] |

In this example, the design-level attributes include: a design identifier (which uniquely identifies the design); page dimensions (e.g. a default page width and height); a design type (e.g. an indicator of the type of the design); a design name (e.g. a string defining a default or user specified name for the design); background (data indicating any page background that has been set, for example an asset identifier of an image that has been set as the page background, a value indicating a particular colour of a solid background fill, or data indicating an alternative background); and element data (discussed below). Additional and/or alternative design-level attributes may be provided, such as attributes regarding design owner, edit date, creation date, design version, design permissions, and/or other design-level attributes.

A design's element data is a set (in this example an array) of element records. Each element record defines an element (or a set of grouped elements) that has been added to the design. In this example, an element record's position in a design's elements array serves to identify the element and determines the depth or z-index of the element (or element group) on the page (e.g. an element at array index n is positioned above an element at array index n−1 and below an element at array index n+1). Element depth may be alternatively handled, however, for example, by storing depth as an explicit element attribute.

An element record defines an object that has been added to a design—e.g. by importing from one or more asset libraries (e.g. libraries of images, animations, videos, etc.), or by otherwise being added to a design page.

Different types of design elements may be provided for depending on the system in question. By way of example, design element types such as the following may be provided: images elements, graphic elements; video elements; audio elements; text elements; colour elements; and/or elements of other types.

As will be appreciated, different attributes may be relevant to different element types. For example, any element that holds visual content such as text, shapes, or media items (e.g., an image, vector graphic, video, etc.) will typically be associated with position and size data, while such data may not be relevant to an element that holds audio media. Accordingly, different element record formats (with different attributes) may be used for different element types.

By way of example, an element record for a media item (e.g., an image, a video, vector graphic, etc.) type element may be as follows:

| Attribute | Note | E.g. |
|---|---|---|
| Element ID | A value uniquely identifying the element. | "0" |
| Type | A value defining the type of the element. | "IMAGE" |
| Position | Data defining the position of the element: e.g. an (x, y) coordinate pair defining (for example) the top left point of the element. | "(100, 100)" |
| Size | Data defining the size of the element: e.g. a (width, height) pair. | "(500, 400)" |
| Rotation | Data defining any rotation of the element. | "0" |
| Opacity | Data defining any opacity of the element (or element group). | "1" |
| Media identifier | Data indicating the media (e.g. an image) that the element holds/is used to display | "M12345" |

As a further example, an element record for a text type element may be as follows:

| Key/field | Note | E.g. |
|---|---|---|
| Element ID | A value uniquely identifying the element. | "0" |
| Type | A value defining the type of the element. | "TEXT" |
| Position | Data defining the position of the element (e.g., x, y coordinate pair). | "(100, 100)" |
| Size | Data defining the size of the element. | "(500, 400)" |
| Rotation | Data defining any rotation of the element. | "0" |

-continued

| Key/field | Note | E.g. |
|---|---|---|
| Opacity | Data defining any opacity of the element. | "1" |
| Text | Data defining the actual text characters | "Happy birthday!" |
| Attributes | Data defining attributes of the text (e.g. font, font size, font style, font colour, character spacing, line spacing, justification, and/or any other relevant attributes) | [{attribute 1}, . . . { attribute n}] |

For ease of understanding, in the above depictions of native design data, only a limited selection of data fields are described; and the names of the data fields have been explicitly stated in respect of their respective data values. In practice, native design data for a design typically includes a large (potentially very large) number of fields. As mentioned above, the native design data format has to capture the entire complexity of a design in the design application, support all features of the application, enable various functionalities, and provide for integration and compatibility. Accordingly, native design data formats typically include a large number of fields that are required, from a back-end operational perspective, but are not necessarily essential for understanding the overall appearance of a design. Additionally, native design data formats are desired to be computationally efficient to minimise storage space requirements and processing times. For example, the native design data format may be such that the position of information in a particular field or sequence may implicitly contain additional information, as opposed to explicitly describing the information with additional characters, or the like. Accordingly, the optimisation of native design data formats can make them difficult for a human (or non-native application) to interpret directly.

In the present disclosure designs may also be represented by a descriptive representation or format, referred to as descriptive design data. As used herein, a descriptive format refers to a textual format that provides for explicit description of its constituent elements and is human readable. Descriptive design data has a natural language lexicon and uses natural language terms to describe the values of its fields. Descriptive design data may include one or more key/value pairs wherein the data explicitly includes the descriptive name of the key/field/attribute alongside the respective value in a particular defined format.

Descriptive design data may include a select set of key/value pairs corresponding to any design attributes, elements, and/or element attributes of the native format data. For each value, the natural language description of the value is stored alongside (or in association with) the value in a human readable format, for example, a JSON format. That is, for each field in descriptive design data, there is included a natural language label for the field stored in conjunction with the value for the field. In one example, descriptive data may include the following elements of design data.

| Key/field Description | Note | E.g. |
|---|---|---|
| Background | A value defining a colour or media item as the background element of the design page. | "Background": "# 1e8239" |
| Style | A value defining a palette of colours and/or fonts applicable to elements in the design. | "style": "Vintage" |
| Elements | Data defining elements, and their respective attributes, in the design. | "Elements": [{"elementID": "n" . . . ] |

Descriptive design data may only describe the elements, and respective attributes, of the design which are relevant to automatically editing the design. In one example, descriptive design data may include all the text, media, and shape elements of the design, as in the below format.

| Key/field | E.g. |
|---|---|
| Text element | {"element id": "0", "element type": "text", "content": "text content here", "font": "Arial", "font-size": "12", "font-colour": "#111111"; "font-style": "bold", "position": "4,0.5"} |
| Media element | {"element id": "1", "element type": "Media", "media type": "image", "image description": "Boxer dog wearing sunglasses", "image keywords": ["dog", "boxer", "canine", "portrait", "pet"], "image type": "photo", "position": "10,2"}, |
| Shape element | {"element id": "2", "element type": "shape", "shape type": "square", "dimensions": 5,5", "line colour": "#111111", "fill colour": "#737373", "position": "0.5,8"} |

Notably, each of the elements include an ID, uniquely identifying the element and respective content and attribute values, for example, position, colour, and the like. Whilst text element content and shape element content is able to be defined directly, media items may have their content described using a textual, natural language description and/or one or more keywords. Whilst the above example of descriptive data is in respect of particular elements and attributes in a human readable JSON format, alternative elements and attributes as well as alternative human readable formats are also possible.

Figure 3:
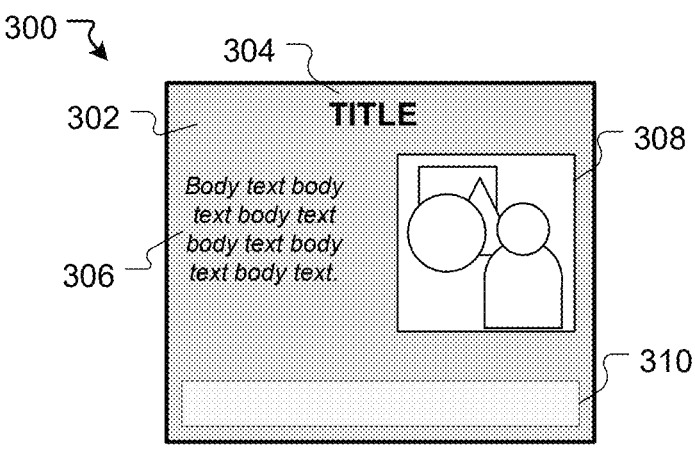
FIG. 3 is an example of a design.

To assist with understanding, the table below provides an example of native design data alongside descriptive design data, each in respect of the same design 300, as depicted in FIG. 3. The design 300 in FIG. 3 includes a page with a coloured background 302; a title of "TITLE" 304, a paragraph of body text 306; a media item (image) element 308; and a shape element 310.

In the present disclosure, processing is performed with respect to designs that include a single design page. To this end, and unless stated otherwise, reference to a design herein is reference to a single page of a design. The techniques described herein may, however, be adapted to be applied to multi-page designs. In case a design includes multiple pages, the design record may store page data that is a set of page records. Each page record may then store design data relevant to that page, such as a page background, and element data. In multi-page designs, the techniques described herein may be adapted by processing each page of a multi-page design separately.

Example User Interfaces

In the present disclosure, server application 120 configures the client system 140 to provide an editor user interface (UI) 400. Generally speaking, UI 400 will allow a user to create, edit, and output designs. FIG. 3 provides a simplified and partial example of an editor UI. In this example the

| Native design data | Descriptive design data |
|---|---|
| {"A":{"B":{" A?":"A","A":"{"abc123"; "1080: 1080"; "poster"; "Test Doc 3"; "#1e8239"; "null"; "0"; "null"; "null"; "null"; "0"; "1"; "0"; "null"; "abcdefghifjkID"; ["0"; "text"; "4,.5"; "2,1"; "0"; "1"; "TITLE"; "Arial"; "12"; "#111111;" bold"}; {"1"; "text"; "0,2"; "3,4"; "0"; "1"; "Body text body text body text body text body text"; "Arial"; "9"; "#111111", "italics: }; {"2"; "IMAGE"; "6,2"; "4.5,5"; "0"; "1"; "M12345"};{"3"; "shape"; "0.5,8"; "10,1"; "0"; "1"; "rectangle"; "#111111"; ""#011e00"}"]; "AAAx1"}; "OWNER"}; "transform"; } "ABC"} | {"background":" #1e8239"}, {"style": "null"}, {"element id": "0", "element type": "text", "content": "TITLE", "font": "Arial", "font-size": "12", "font-colour": "#111111", "font-style": "bold", "position": "4,0.5"}, {"element id": "1", "element type": "text", "content": "Body text body text body text body text body text body text", "font": "Arial", "font-size": "9", "font-colour": "#111111", "font-style": "italics", "position": "0,2"}, {"element id": "2", "element type": "Media", "media type": "image", "image description": "person in front of shapes on white background", "image keywords": ["person", "shapes", "portrait"], "image type": "photo", "position": "6,2"}, {"element id": "3", "element type": "shape", "shape type": "rectangle", "dimensions": 10,1", "line colour": "#111111", "fill colour": "#737373", "position": "0.5,8"} |

In this example, the descriptive design data includes only the fields of background, style and a set of elements, each element including a unique identifier, a type, corresponding content and attributes, and a position. In the case of text elements, the attributes may include the font size, font colour, bolding, italicised, etc. In the case of shape elements, the attributes may include the shape type, line and fill colour. In the case of media elements, the attributes may include the media type, a description of the media and/or keywords in respect of the media. Significantly, the descriptive design data includes natural language descriptions for each of the values it contains and is able to be read and interpreted by a human. On the other hand, the native design data includes the same values, however, they are implicitly defined by their position in the structure of the native design data format. In practice, native design data is usually of significantly greater length and complexity so that it can cater for all (current and/or future) possible functionality of the design application. However, a significant proportion of this native design data may not be relevant to editing a design in a particular action. Moreover, the native data includes additional values which may be relevant to the back-end operations of a design application but are not necessary for understanding (and may obscure) the design. Thus, the native format design data is not readily interpretable as a natural language description of a design and its constituent elements.

editor UI 400 is a graphical user interface (GUI). The GUI may be displayed to a user, for example, on display 218 of client system 140 as an interface of client application 142.

Editor UI 400 includes a design preview area 402. Design preview area 402 may, for example, be used to display a page (or, in some cases multiple pages) of a design 404 that is being created and/or edited.

In this example an add page control 406 is provided (which, if activated by a user, causes a new page to be added to the design being created) and a zoom control 408 (which a user can interact with to zoom into/out of page currently displayed).

GUI 400 also includes selection area 410 which may be used, for example, to select and retrieve existing designs and/or other assets that application 120 makes available to a user to assist in creating designs. Different types of assets may be made available, for example design elements of various types (e.g. text elements, geometric shapes, charts, tables, and/or other types of design elements), media items of various types (e.g. photos, vector graphics, shapes, videos, audio clips, and/or other media), design templates, design styles (e.g. defined sets of colours, font types, and/or other assets/asset parameters), and/or other assets that a user may use when creating a design. In this example, selection area 410 includes several type selectors 412 which allow a user to, for example, search for and retrieve various types of assets for inclusion in the design. When a user selects a particular type control 412, they may be provided a search interface to input a search string and application 120 may display previews (e.g. thumbnails or the like) of any search results for the selected type.

Figure 4:
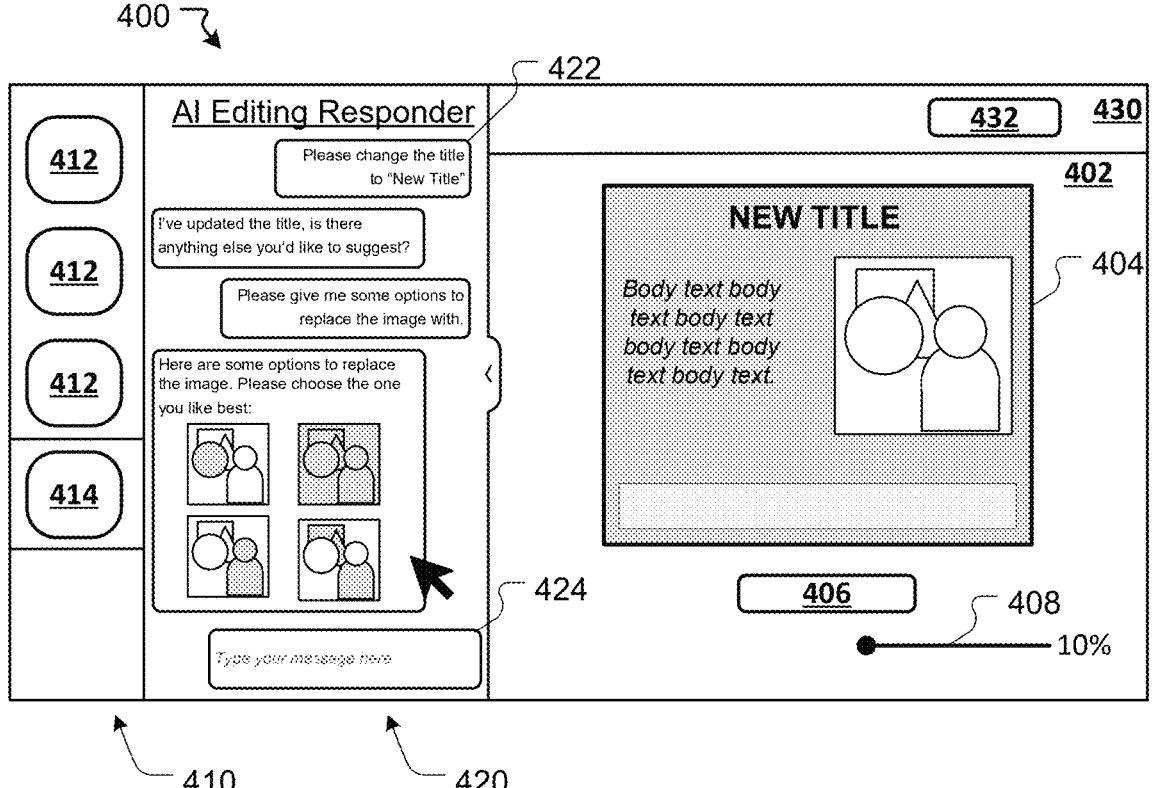
FIG. 4 is an example design application graphical user interface depicting a field for receiving a user input for editing design elements of a design

In the present example, GUI 400 also includes an automatic edit type control 414 in the selection area 410. Selection of automatic edit type control 414 (as is depicted in FIG. 4) may provide an automated design editing area 420 for a user to request the automated editing of the design. Automated design editing area 420 includes a conversation area 422 and a user input field 424 where a user may input a message, for example, to request an automated edit in respect of the design. The conversation area 422 may include a conversation history or previous user input messages and replies. The user input field 424 may include placeholder text, for example, "Type your message here . . . " or alternative text, which directs a user to input their message in this field. A user inputting and entering their message in field 424 of the automated design edit area 420 may commence or continue a conversation for editing the design. In the example of FIG. 4, the design 404 is substantially similar to the design 300 of FIG. 3 except that the content of the title element has been automatically updated to "New title" in response to an input user request.

The GUI 400 further depicts, in the automated design edit area 420, four options of images to replace the current image of the design 404. A user may select one of the suggested options to cause the design 404 to be automatically updated with the selected image wherein the GUI 400 will display the updated design including the selected image. After which, further messages and requests may be provided in the field 424 to continue automatically editing the design. These operations are described in detail further below.

GUI 400 also includes an additional controls area 430 which, in this example, is used to display additional controls. For example, control 432 may be a permanently displayed 'publish' control which a user can activate to publish, share, or save the design currently being worked on. Many additional controls and alternative additional controls are possible. For example, an editor GUI may include many other controls that permit designs to be created, edited (by creating/adding design elements such as images, text, videos, and/or other elements), and output (e.g. saving to local memory, a server data store such as data storage 116, printing, publishing via social media, and/or other means) in various ways. Alternative interfaces, with alternative layouts and/or alternative tools and functions, are also possible.

Example Methods

Figure 5:
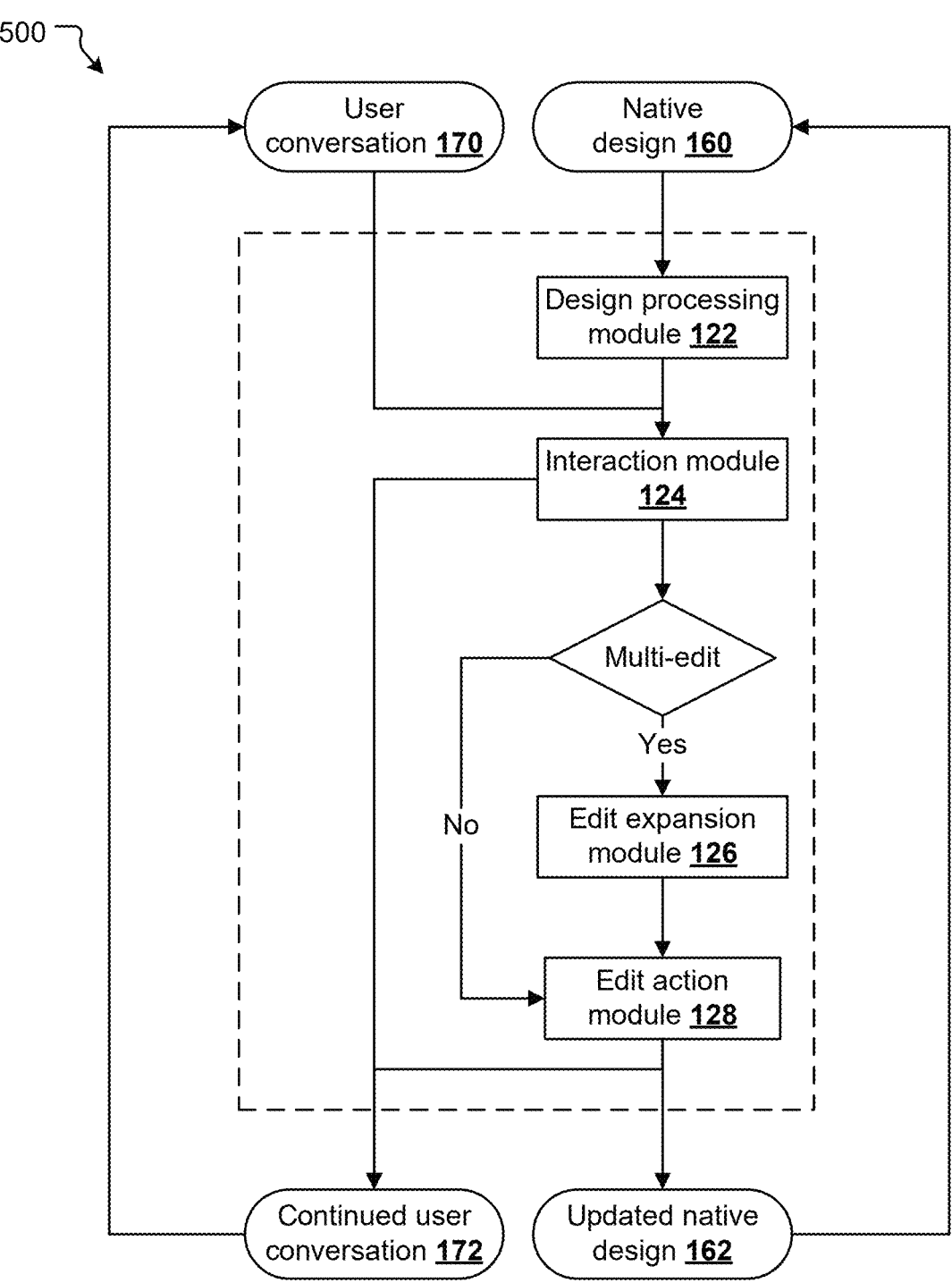
FIG. 5 is a block diagram of a system architecture for editing designs.
Figure 6:
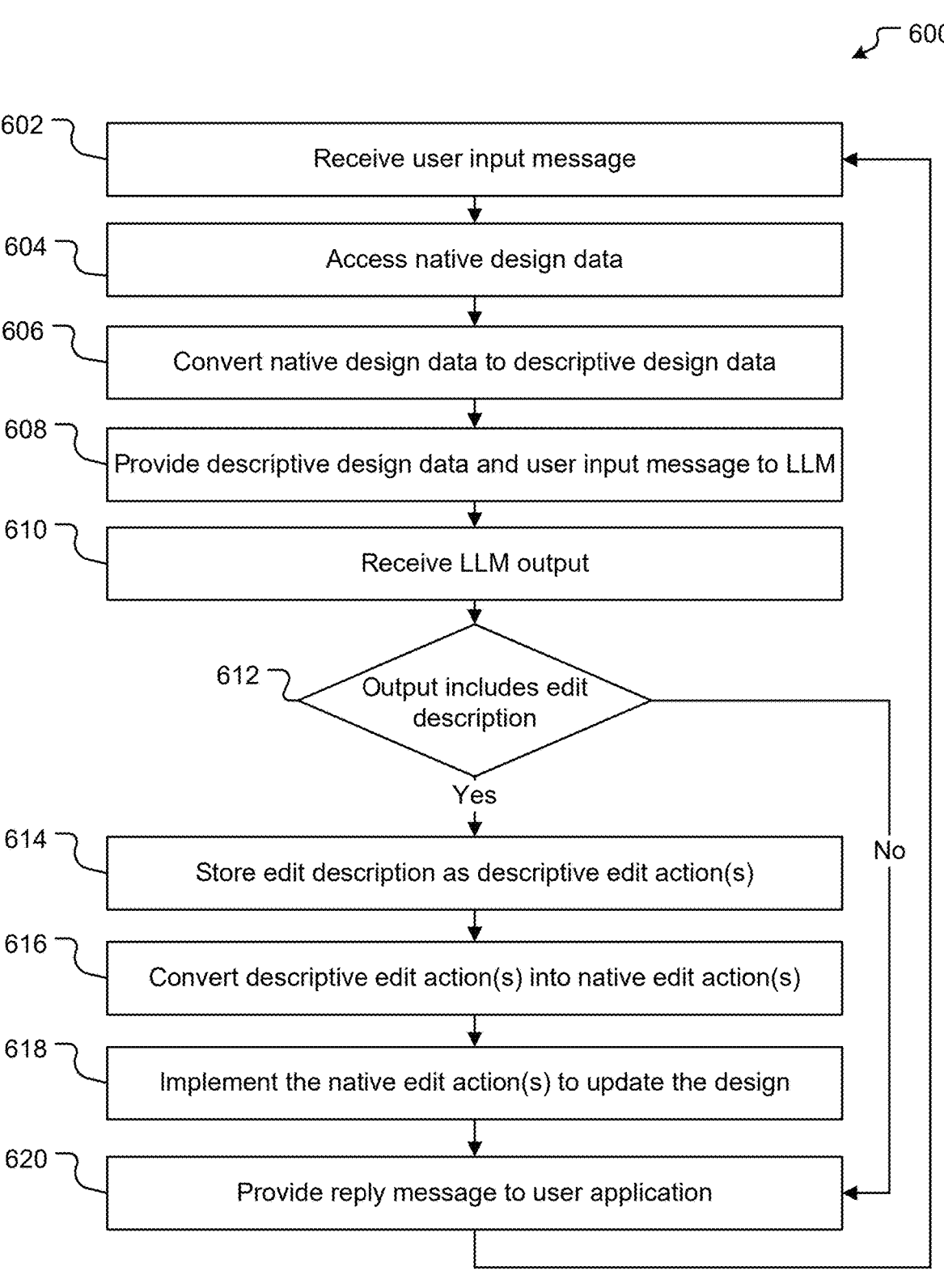
FIG. 6 is a process flowchart depicting an example method for editing designs.

Turning to FIG. 5 and FIG. 6, a computer implemented method 600 for automatically editing a design will now be described. FIG. 5 shows an exemplary system architecture 500 for performing the method whereas FIG. 6 shows a process flow of steps included in the method.

The operations of method 600 will be generally described as being performed by server application 120 (and the various associated modules), running at server environment 110, in association with the ML system 130 and in association with the client application 142 running on client system 140. In alternative embodiments, however, the processing described may be performed by one or more alternative applications running on the server computer processing hardware 112 and/or other computer processing systems. Where client application 142 operates to display controls, interfaces, or other objects, client application 142 does so via one or more displays that are connected to (or integral with) system 200—e.g. display 218. Where client application 142 operates to receive or detect user input, such input is provided via one or more input devices that are connected to (or integral with) system 200—e.g. a touch screen, a touch screen display 218, a cursor control device 224, a keyboard 226, and/or an alternative input device.

Applications 120 and 142 may be configured to perform method 600 in response to detecting one or more trigger events. For example, application 120 may communicate with application 142 (e.g., via network 150) to cause application 142 to display a GUI, e.g. user interface 400 displayed in FIG. 4. The method 600 may commence, for example, when a user inputs a message (e.g., a string a text) into user input field 424, for example, to request an automated edit in respect of the design. Alternatively, method 600 may commence when a user selects the automatic edit type control 414 which causes display of the automated design editing area 420 including the user input field 424.

In overview, the method 600 may involve one or more instances of a conversation with a user to automatically edit a design in a design application. Each instance of the conversation includes a user input message, a reply from the application 120, and/or one or more edits to the design. In some instances, the user input message may request design comments or design suggestions to help guide editing the design, the instance of the conversation may only involve receiving a reply from the application 120, without edits occurring. The method includes the application 120 accessing a native design 160, that is, accessing native design data defining a design for editing (e.g., the design 404 that is currently being edited in GUI 400). The method also includes the application 120 accessing (or receiving) a user conversation 170, for example, receiving a user input message in respect of the design for editing.

Broadly speaking, the user conversation 170 includes one or more user input messages (and one or more replies from application 120). The native design 160 is defined by native design data, defining one or more design elements in a format native to the design application. The native design data of the native design 160 is retrieved by the design processing module 122 and converted into descriptive design data, providing a text descriptive representation of the native design. The user conversation 170 and the descriptive design data are passed to the interaction module 124. The interaction module is configured to provide the user conversation and descriptive design data to the ML system 130, along with configuration data which causes the ML system 130 to output a reply to the user message and design edit(s).

If the ML system 130 output includes an edit description of a simple change to the design (e.g., a single edit description), the interaction module 124 is configured to process the edit description into a descriptive design action and pass the descriptive edit action to the edit action module 128. If the ML system 130 output includes a description of a complex change (e.g., a multi edit description), the interaction module 124 is configured to pass the edit description of the complex change to the edit expansion module 126. The edit expansion module 126 is configured to process the multi edit description of the complex change and expand the multiple edits into a set of single descriptive edit actions, which are then passed to the edit action module 128.

The edit action module 128 is configured to convert each descriptive edit action into a native edit action and implement the native edit action to update the native design 160 and provide the updated native design 162 to the client application 142. The interaction module 124 is also configured to provide the reply, from the ML system 130, to the user input message in the continued user conversation 172. Accordingly, the application 120 (and associated modules) are configured to translate a native representation of a design, in a format native to a design application, into a descriptive format suitable for processing by a generative AI model such as an LLM. Moreover, descriptions of edits as output by an LLM may be translated back into a native format suitable for implementation within the design application.

Throughout method 600, data in respect of each instance of the user conversation 170 may be stored in various formats. As one example, conversation data, in respect of user conversation 170 may be stored as an edit conversation record including a set (e.g., an array) of one or more conversation instance records. An edit conversation record may include a unique identifier for the conversation, an identifier for the design being edited, and a set of one or more conversation instance records. Relevant data may be accessed by the application and stored to a conversation instance record (as one of a set instance records) in an edit conversation record. An edit conversation record may be initiated (or an existing record retrieved) at the commencement of method 600 to begin (or continue) a conversation. An example of an edit conversation record may be as below:

| Conversation record ID | "c1234" |
| Related design ID | "abc123" |
| Conversation instances | [{ conversation instance 1}, .. conversation instance n}] |

Many additional and/or alternative data fields may be provided in edit conversation records, for example, a User ID, a design page ID (for multi-page designs), and the like. Conversation data may be stored in respect of a particular user, a particular design, and/or a particular session.

The user conversation 170 may thus be stored and retrieved as conversation data (in the form of an edit conversation record including one or more conversation instance records) to and from the data storage 116. An example of the structure and types of data stored in each conversation instance will be described below over the course of method 600.

A conversation instance record may be initiated upon receiving a user input message (e.g., as input by a user in field 424 of GUI 400). If the conversation instance is the first conversation instance then an edit conversation record may be initiated to store the conversation instance. Otherwise, the newly initiated conversation instance record may be added to an existing edit conversation record (i.e., to continue the conversation data in respect of a continued user conversation 172). Alternatively, a conversation instance record (and edit conversation record, if necessary) may be initiated in anticipation of receiving a user input message (e.g., upon detecting selection of automatic edit type control 414). Additionally, or alternatively, a (further) conversation instance record may be initiated upon completion of a previous conversation instance. In some embodiments, a conversation instance record (and edit conversation record, if necessary) may be initiated, in parallel with one or more steps of method 600.

At step 602 the application 120 receives a user input message, for example, a message input by a user in field 424 of GUI 400. The message is a string of natural language text input by the user, for example, requesting an edit in respect of the design and/or requesting analysis or advice in respect of the design. The user input message may be manually input by the user (e.g., typed) or the user may select a suggested quick response message option as their user input message. The user input message (or portions thereof) may be stored to a conversation instance record in respect of the current instance of the edit conversation record for the user conversation 170.

An example of a conversation instance record at this stage is displayed below:

| Conversation instance ID | "i1234" |
| User input message | "{Please change the title to "New Title" and suggest options for a new image"}" |

In addition to capturing the user input message, alternative information may also be included in the conversation instance record at this stage, such as the current element selection state (e.g., design element(s) selected in the GUI 400), allowing the user to provide their request in respect of a selected design element (or group of design elements) in the design. Initially, the user conversation 170 will include only the first input message. That is, at first, the edit conversation record will only include a single conversation instance record. As instances of conversation continue, the user conversation 170 will expand to include multiple input messages and corresponding replies. That is, additional conversation instance records will be added to the edit conversation record in the continued user conversation 172. Once the user input message is received, the method proceeds to step 604.

At step 604, the application 120 (e.g., the design processing module) is configured to access native design data defining a native design 160 for editing. Typically, the native design 160 will be the design (e.g., design 404) currently displayed in the user interface (e.g., GUI 400) of the client application 142. Although, it is also envisioned that a native design 160 could be edited via a user conversation 170, without requiring explicit display of the native design 160 to the user. The design processing module 122 may retrieve native design data from the data storage 116. The native design data may include data in a native format, defining all the attributes and elements of the native design 160, the native design data including one or more native format design elements, the native format design elements including one or more native format design attributes.

At step 606, the native design data, of the native design 160, is converted into descriptive design data providing a textual, descriptive representation of the native design 160. The design processing module 122 is configured to process the native design data and convert one or more of the native format design elements into corresponding descriptive format design elements and store the one or more descriptive format design elements as descriptive design data in respect of the native design 160. An example process for converting native design data to descriptive design data, as at step 606, will be described in further detail below, with reference to FIG. 7. The descriptive design data as at the current conversation instance is stored as current design data in the conversation instance record.

An example of a conversation instance record at this stage is displayed below:

| Conversation instance ID | "i1234" |
|---|---|
| User input message | "{Please change the title to "New Title" and suggest options for a new image"}" |
| Current descriptive design data | [{Descriptive design element 1}, . . . Descriptive design element n}] |

In this example, the current descriptive design data is a descriptive representation of the state of the design as at the conversation instance. Many additional and/or alternative data fields may be provided in conversation instance records, for example, the number of (native and/or descriptive) elements in the design, the current native design data may be included, additional descriptive design information (e.g., dominant colour information of each element), and the like.

The conversation instance record including the descriptive design data and user input message are passed (by the design processing module 122 and/or application 120) to the interaction module 124.

At step 608, the interaction module 124 is configured to provide the descriptive design data and user input message to the ML system 130 for processing. The descriptive design data and user input message may be provided to the ML system 130 along with configuration data to configure the ML system 130. Alternatively, the ML system 130 may be configured in advance and the descriptive design data and user input message then provided to the ML system 130. In some embodiments, the user conversation 170 history (e.g., user input messages and replies from previous conversation instance records) may also be passed to the interaction module 124 (and/or ML system 130). For example, data from previous conversation instance records in the edit conversation may be included in the processing, by the interaction module 124 (and/or ML system), to provide context to the current conversation instance.

In this example, the ML system is a general purpose LLM configured to receive and process natural language text inputs and provide natural language text outputs. Although, in alternative embodiments the ML system 130 may be (or implement) an alternative AI model. The configuration data provided by the interaction module 124 to the ML system 130 provides the LLM instructions to process the inputs of the descriptive design data and user message, and output a reply message and, if requested by the user message, an edit description. In one example, the configuration data may take the form of a configuration prompt (e.g., a system prompt) for passing to the LLM along with (or in advance of) providing the user message and descriptive design data. An example of interaction configuration data is described in further detail below.

The output of the LLM can include one or more of the following components, depending on the requests contained in the input user message and the nature of the current descriptive design data:

1) A reply to the user input message:
    a. A reply providing design comments, suggestions or advice in natural language (e.g., where the user input message is "How could I improve my design?", the output may include "Consider applying a style palette to the design to increase visual impact; and increasing the text size of the title to make it stand out."); and/or
    b. A reply requesting additional information from the user (e.g., where the user input message is "Please improve the title", the output may include "Would you like to update the content of the title, its style, or both?").

2) Edit description(s)
    a. A single edit description for a relatively simple change to the design (e.g., a description of a single change to a single element of the design, suitable for capture by a single descriptive edit action).
    b. A multi edit description for a relatively complex change to the design (e.g., a description of multiple changes to an element and/or changes to multiple elements, suitable for capture by a set of descriptive edit actions).

3) Quick responses (e.g., suggested responses a user can select to continue the conversation)

As outlined above, in order to configure the ML system 130, in the form of an LLM, to output the design comments and/or descriptions of changes to make to the design, the interaction module 122 provides the LLM configuration data. The configuration data configures the LLM to process the descriptive design data and input user message (and potentially previous user conversation 170 history), and to output a reply to the user message; either a single edit description, for a simple design change, or a summary description of more complex design changes as a multi-edit description; and suggested quick responses to continue the conversation. The configuration data may include a brief description of the task (e.g., to generate a reply to a user message and generate an edit description to update a design), parameters for the task (e.g., input and output format, design format, edit description format, edit action format, tone of the output, rules, etc.), and one or more (some-shot) examples of inputs and the text content the LLM is expected to output based on the inputs.

As a general example, the interaction configuration data may be (or include) a configuration prompt as below, wherein the "Design" refers to the descriptive design data and the "message" refers to the user input message:

| Description of task: | Help users edit their design by considering the design and generating a reply to the message. Converse with the user to understand how they want to change the design and create Edit descriptions to edit the design. Suggest quick_responses that a user may respond to your reply with. Provide the outputs in the defined formats. |
|---|---|
| Parameters: | "The design includes a background, a style, and a set of text type, shape type, and/or media type elements. The elements include respective attributes according to their type." |
| | "Edit_descriptions may be a single edit description or a multi-edit description. Where there is a single change to a single element of the design, used a single_edit_description. Where there are multiple changes to an element or multiple elements of the design are to be changed, use a multi_edit_description." |

-continued

```
                "Single_edit descriptions are output in the format defined by
                desriptive_edit_acitons."
                "Multi_edit_descriptions are output as descriptive summaries of
                the changes, for expanding into a set of descriptive_edit_actions
                by a separate agent."
                "If the user directly requests an edit, apply the edit. If a user
                requests options to choose from, suggest between two to four
                options from which they may select."
                "Descriptive_edit_actions: <DESCRIPTIVE EDIT ACTION
                FORMAT>"
                "the design: <DESCRIPTIVE DESIGN DATA>"
                "the message: <USER INPUT MESSAGE>"
Examples:       User input message:
                "Increase the font size of the title"
                LLM System Output:
                "I've increased the font size of the title. Is there anything else
                you'd like to adjust?"
                "Single_edit_description: "create_or_modify_elements":
                {"action_type": "UPDATE", "id": "2", "font-size": "16"}"
                "Quick_responses: 1) Make the title even bigger. 2) Suggest
                styles to apply to the design. 3) Suggest images to add to the
                design. 4) Add a sub-title."
                User input message:
                "Remove the shapes, make the background darker and swap the
                second image to a photo of a cat"
                LLM Output:
                "I've removed the shapes, made the background a darker green
                and changed the image of the dog to an image of a cat. Is there
                anything else you'd like to adjust?"
                "Multi_edit_description: Delete element 0 and 4. Change the
                background colour to a dark forest green. Replace the image of
                a dog wearing sunglasses with a photo of a cat wearing a party
                hat."
                "Quick_responses: 1) Undo those changes. 2) Add the shapes
                back. 3) Apply a party style to the design. 4) Suggest alternative
                image options."
```

It will be appreciated that the configuration data may include many alternative components and configuration prompt components. For example, the some-shot examples could include exemplary descriptive design data. In one example, the configuration data may be (or include) a single pre-assembled prompt—e.g. a string that includes all the relevant configuration components. Alternatively, separate configuration prompts may be generated including separate components and combinations thereof. The ML system 130 can thus be configured by providing the configuration data as a prompt, part of a prompt, or a series of prompts.

In the above example of a configuration prompt, the <DESCRIPTIVE DESIGN DATA>; and <USER INPUT MESSAGE> are placeholders that may be populated with the relevant descriptive design data of the design and the relevant user input message (and conversation history). The descriptive design data includes descriptive representations of relevant design elements in the design. The descriptive design data may also include the dominant colours of media items included in the design (as or in addition to the descriptive key words of media item content), the type of the design (e.g., poster, presentation, invitation, etc.), the dimensions of the design and/or dimension of the elements, and many alternative attributes of the design. Furthermore, many additional or alternative types of information may be provided to the LLM. For example, the current element selection state (i.e., the ID of the element(s) the user had selected when providing the input message). This may allow a user to provide context and to request edits in respect of particular element(s) by clicking the element, or highlighting groups of elements, for example in the GUI 400, alongside their request.

In the above, the <DESCRIPTIVE EDIT ACTION FOR-MAT> is also a placeholder that may be populated with a defined structure for descriptive edit actions corresponding to edit functionalities supported by the application 120. The descriptive edit action format defines a schema that provides the format of desired changes/updates to a design and the required fields and types. The descriptive edit action format is a textual descriptive representation of the types of edit actions (and the required parameters) natively supported by the design application. The defined descriptive edit action format (and thus, descriptive edit actions) are suitable for processing and generation by the LLM. The descriptive edit action format can support any desired edit actions natively available within the design application. Many structures for descriptive edit action formats are possible. In the below example, for ease of explanation, only a selection of possible edit actions are described. Although, the descriptive edit actions and their structure may be extended to support any number of editing features. Broadly speaking, the descriptive edit action format includes, for each edit action: a natural language description of the action; the ID of the element(s) in respect of the action; the attribute(s) of the element(s) to be edited in respect of the action; and the edited value(s) for attribute(s) in respect of the action.

As a general example, the descriptive edit action format may include a definition of the structure for creating, deleting, or updating design elements (text, shapes, media items) and the style and background of a design. As one non-limiting example, the descriptive edit action format may be (or include) the following definitions of edit actions, in a human readable JSON format:

```
                          Descriptive_edit_actions:

"update_background": { //update the value for the background
    "background": "<NEW VALUE>"   // new value for background - hex code for
}                                 // colour or media item key words
"update_style": { //update the value for the style
    "style": "<NEW VALUE>" // keywords for new style
}
"create_or_modify_elements": {
    "action_type": "DELETE", // delete action
    "id": "<ID>" // ID of element to delete
}
"create_or_modify_elements": {
    "action_type": "UPDATE", // update action
    "id": "<ID>", // ID of element to update
    "attribute": "<ATTRIBUTE>" // attribute of element to update
    "value": "<NEW VALUE>" // new value of attribute to update
}
"create_or_modify_elements": {
    "action_type": "CREATE"], // create new text or shape type element
    "element_type": "<ELEMENT>"] { // text or shape type of element to create
        [["attribute": "<ATTRIBUTES>"]] // array of attributes of element
    }
}
"create_or modify_elements": {
    "action_type": "CREATE", // create new media type element
    "element_type": "media" {// create new media type element
        "media type": "<media type>" // type of media element to create
        "description": "<DESCRIPTION>" // description of media element
        ["keyword": "<KEYWORDS>"] // array of keywords for element
        ["attribute": "<ATTRIBUTES>"] // array of attributes of element
    }
}
```

In the above example, the descriptive edit actions include, in natural language terms, a description of the action and the relevant fields required for the action in human readable terms, suitable for processing and outputting by an LLM. Additional and/or alternative edit actions may be provided, for example, undo edit actions, rotate edit actions, and special function edit actions such as remove background, smart crop, etc. Additionally, the edit actions may allow that, for example, an update action may be applied in respect of multiple elements via the "id" field containing an array of element IDs. Similarly, an array of multiple attributes may be updated via an array of multiple new values. Whilst the format is provided in a JSON format defining particular actions, fields and types, it will be appreciated that many alternative formats and structures for defining descriptive edit actions are possible. Furthermore, the descriptive edit action format may be updated and expanded to facilitate additional edit actions and additional functionalities in respect of additional elements.

At step 610, the output of the LLM is received by the interaction module 124. The LLM output is a text output in a format according to the configuration of the LLM. The interaction module 124 then processes the LLM output and identifies and stores components of the output. Processing of the LLM output includes identifying a reply message from the LLM, identifying if an edit description is included in the output; identifying if the edit description is a single edit description for a simple change or a multi edit description of a complex change (multiple changes) to the design; and identifying any suggested quick responses.

An example of a conversation instance record at this stage is displayed below:

| | |
|---|---|
| Conversation instance ID | "i1234" |
| User input message | "{Please change the title to "New Title" and suggest options for a new image"}" |
| Current descriptive design data | [{Descriptive design element 1}, . . . {Descriptive design element n}] |
| LLM Output | [{"<Reply>"}, {"<Single edit description>" or "<Multi edit description>"}; "<Quick response suggestions>"}] |

The LLM output may be stored as a single text string or may be processed (e.g., parsed) by the interaction module 124 and respective components of the LLM output identified and stored as respective LLM output components (e.g., a reply component; a change description component; and a quick response suggestions component). In the above example, for ease of representation, the LLM Output values "<Reply>", "<Single edit description>", "<Multi edit description>" and "<Quick response suggestions>" are symbolic representations of the text components actually contained in an LLM output. The actual LLM output reply will include a natural language reply to the user input message; an edit description, in the defined format, based on the user message; and natural language quick response suggestions. In practice, not all LLM outputs will necessarily include all components, but may. Typically, the LLM output will include either a single edit description or a multi edit description. Although, some LLM outputs may only include a reply but not include any edit description(s). In some cases, depending on the configuration data (and user preferences), the LLM may be configured such that LLM output does not include quick response suggestions.

Using the example of the user input message of "Please change the title to "New Title" and suggest options for a new image", the LLM output may include: a reply component of "I've updated the title. Here are some suggestions for a new image: <PLACEHOLDER>"; a multi edit description component of "update the content of element 0 to be "New Title", and suggest 4 options for "photos" of "a person in front of shapes" to update element 2"; and a quick response suggestions component of "1) Change the background colour to match the image. 2) Suggest styles to apply to the design. 3) Make the title bigger. 4) Swap the position of the paragraph and the image." As will be explained in further detail below, the "PLACEHOLDER" in the reply component may later be populated with options for the image described in the edit description component.

As another example, if the user input message was instead only "Please change the title to "New Title"" (i.e., a request for a single edit), the LLM output may instead include a single edit description component of ""{"action type": "UPDATE", "id": "0", "content": "New Title"}", with suitable reply and quick response suggestion components. Notably, the single edit description is in the format of a descriptive edit action. As a further example, where the input user message requests design advice or further information is required (by the LLM) to generate an edit description, the LLM output may include a suitable reply and quick response suggestions without including an edit description. Many alternative LLM outputs are possible according to the user input message and configuration data.

At step 612, the interaction module determines if the LLM output includes an edit description. That is, the interaction module may parse the LLM output and identify if it includes an edit description according to the defined single or multi edit format. In some instances, where the output of the ML system 130 does not include an edit description (i.e., No at step 612), for example, the output is only a reply with design comments, design suggestions, or a request for further information, the interaction module 124 may provide the reply message to the user to continue the user conversation 172, without requiring any processing by the edit expansion module 126 and/or edit action module 128, for the current instance of the conversation. In such an instance, the method 600 may proceed straight to step 620 and provide the reply message (and quick response suggestions) to the user application.

If the output of the LLM does include an edit description (i.e., Yes at step 612), the method proceeds to step 614. At step 614, the edit description is stored as one or more descriptive edit actions. The manner by which the raw edit description, received from the LLM, is (processed into and) stored as one or more native edit actions depends on the type and complexity of the edit description. Broadly speaking, the edit description may be stored (directly or indirectly) as one or more descriptive edit actions according to one of the below processes:

1) Where the LLM output includes a single edit description:
   a. the single edit description may be stored directly as a descriptive edit action;
   b. the interaction module 124 may process the single edit description and convert it into a descriptive edit action.
2) Where the LLM output includes a multi edit description:
   a. the edit expansion module 126 may process the multi edit description and the multi edit description action into a set of descriptive edit actions.
   b. the edit expansion module 126 may communicate with the ML system 130 to convert the multi edit description into a set of single edit descriptions:
   i. the set of single edit actions may be stored directly as a set of descriptive edit actions;

ii. the edit expansion module 126 may process the set of single edit actions and convert each into a descriptive edit action.

Accordingly, the interaction module 124 is configured to determine if the edit description received from the LLM is a single edit description (i.e., description of a single edit to one element) or a multi edit description (i.e., description summary of multiple edits to one or more elements). If the LLM output includes a single edit description, the interaction module is configured to process the LLM output and store the single edit description (directly or via conversion) as a descriptive edit action. An example of processing the LLM output single edit description and storing a descriptive edit action is described in further detail below, with respect to FIG. 8, and FIG. 9. The descriptive edit action may then be passed directly to the edit action module 128 without requiring expansion by the edit expansion module 126.

Alternatively, if the output of the LLM includes a multi edit description, the interaction module 124 is configured to pass the multi edit description to the edit expansion module 126. The edit expansion module 126 is configured to (directly and/or via the ML system 130) expand the multi edit description into a set of descriptive edit actions and store the descriptive edit actions. An example of processing the LLM output multi edit description and storing a set of descriptive edit actions is described in further detail below, with respect to FIG. 8, and FIG. 10.

An example of a conversation instance record at this stage is displayed below:

| | |
|---|---|
| Conversation instance ID | "i1234" |
| User input message | "{Please change the title to "New Title" and suggest options for a new image"}" |
| Current descriptive design data | [{Descriptive design element 1}, . . . {Descriptive design element n} ] |
| LLM Output | [{"Reply"}, {"Single edit description" or "Multi edit description"}; "Quick response suggestions"}] |
| Descriptive edit actions | [Descriptive edit action 1}, . . . Descriptive edit action n}] |

The descriptive edit action(s) and/or conversation instance record, as a whole, is then passed to the edit action module 128 for processing and the method proceeds to step 616.

At step 616, whether the edit action module 128 receives a single descriptive edit action from the interaction module 124, or a set of descriptive edit actions from the edit expansion module 126, the edit action module 128 is configured to convert each descriptive edit action from the descriptive format into a native edit action. In overview, converting a descriptive edit action into a native format includes processing the descriptive edit action; identifying the relevant action type, element id, attribute, and value described in the descriptive edit action; and generating a native edit action including a corresponding action type, element id, attribute, and value in a native format. An example process for converting descriptive edit actions into native edit actions is described in further detail below, with respect to FIG. 8 and FIG. 11.

An example of a conversation instance record at this stage is displayed below:

| | |
|---|---|
| Conversation instance ID | "i1234" |
| Current descriptive design data | [{Descriptive design element 1}, . . . {Descriptive design element n} ] |
| User input message | "{"Please change the title to "New Title" and suggest options for a new image"}" |
| LLM Output | [{"Reply"}, {"Single edit description" or "Multi edit description"}; "Quick response suggestions"}] |
| Descriptive edit actions | [Descriptive edit action 1}, . . . {Descriptive edit action n} ] |
| Native edit actions | [Native edit action 1}, . . . {Native edit action n}] |

The method then proceeds to step 618, wherein the edit action module 128 is also configured to implement the native edit actions to apply the edits to the design, thereby updating the native design 160 into updated native design 162. The updated native design 162 is sent to the client application 142 causing display of the updated design, including the applied edits, on the client system 140.

At step 620, the interaction module 124 is configured to provide the reply message from the LLM to the user application 142. For example, the replay message may be displayed in the conversation area 422 on the GUI 400. Providing the reply message may also be performed in conjunction with edit action module 128. For example, where the edit action(s) included options, the edit action module 128 may populate a reply message with the options for selection by a user. The reply message (including any options) is then sent to the user to continue the user conversation 172. Once an option is selected, the respective edit action may be implemented, according to the selected option, and the updated design data sent to the client application 142 to cause display of the updated design on the client system 140.

The method 600 may operate in a loop, wherein at the end of an instance of conversation (and editing), the continued user conversation 172 and/or updated design 162 may then serve as the basis of the user conversation 170 and the native design 160 in a further instance of conversation for continuing to automatically edit the design. That is, upon completion of step 620, the method may return to step 602 to receive a user input message and begin the method again.

In this example, method 600 is depicted with input user message being received before accessing and converting the native design data into descriptive design data. In alternative embodiments, method 600 may commence by accessing and converting the native design data into descriptive design data in anticipation of receiving a user input message. In conversation instances where no edits were made to the native design 160, for example, the reply was only design advice, the method 600 may loop to step 602, but forego steps 604 and 606, instead relying on the unchanged descriptive design data of the previous conversation instance also as the current descriptive design data. In some embodiments, rather than re-accessing and converting native design data as a whole, only those native elements updated (e.g., at step 618) may be re-accessed and reconverted to generate current descriptive design data providing a descriptive representation of the updated native design 162.

Whilst steps 602-620 of method 600 are illustrated as a loop of sequential decisions and steps, alternative implementations for automatically editing designs and conversing with a user are possible. For example, the accessing of the native design data and converting of the native design data to descriptive design data (e.g., as at steps 604 and 606) may occur in parallel with (or after) receiving the user input message (e.g., as at step 602). As another example, native edit actions may be implemented in parallel with (or after) providing the reply message to the user application (e.g., steps 618 and 620).

Figure 7:
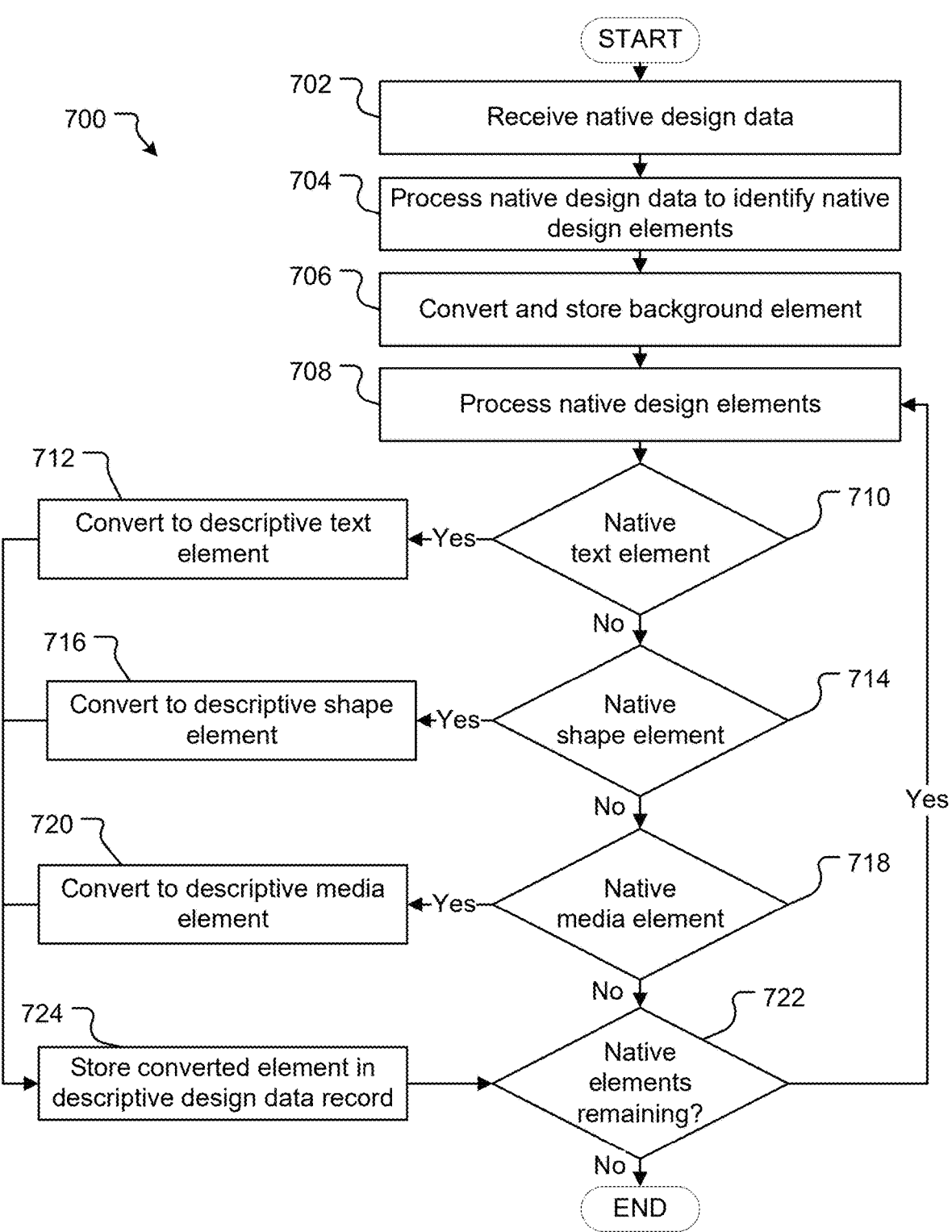
FIG. 7 is a process flowchart depicting an example method for converting design data from a native format into a descriptive format.

Referring now to FIG. 7 a computer implemented method 700 for converting design data from a native format to a descriptive format will now be described. In overview, method 700 involves converting a native representation of a design from a format that is native to (and compatible with) a design application into a descriptive representation of the design that describes the design in a human readable format. In particular, each native design element, considered relevant to the descriptive representation of the design, is converted into a corresponding descriptive design element. Where the attributes values of a native design element may be meaningfully expressed as numerical or textual content (e.g., text content, font-size, position), such values are directly converted into corresponding values in descriptive design elements. Where an attribute value of a native design element (e.g., asset IDs referring to a media item, style palette, etc.) is not able to be converted directly into a textual format meaningfully descriptive of the value, instead a description of the value (e.g., a description of the media item, style palette, etc.) is generated (or retrieved) and stored as the corresponding value(s) in the descriptive design element. For example, text content may be descriptively represented as text content whereas an image may be descriptively represented by a textual description describing the image.

In method 700, the design processing module 122 is configured to interpret native design data and identify relevant fields in the data, according to their position and the defined structure of the native design data. For example, the design processing module 122 may parse a native design data record and extract particular elements and values based on their position in the native design data and/or the presence of particular keywords and/or values.

At step 702, the design processing module 122 receives native format design data, for example, by retrieving the data from data storage 116. The native design data includes one or more native design elements. At step 704 the design processing module 122 processes the native design data to identify the native design elements relevant to providing a descriptive representation of the design. For example, the design processing module 122 may process the native design data to identify its background element (and style element, if applicable), its text elements, its shape elements, and its media elements. In alternative embodiment, additional and/or alternative design elements may be defined as relevant to the descriptive representation of a design.

At step 706, the design processing module 122 converts the native background element of the design into a descriptive background element. The descriptive background element may include a natural language term describing the element, for example "background" and a value corresponding to the element, for example, a hex code for a colour of the background. Where the design includes a style element, the design processing module 122 may also convert the native style element into a descriptive style element, including a natural language term describing the element, for example, "style" and a description of the style palette used for the design (e.g., vibrant, vintage, classy, etc.). The terms for use as the description of the style palette may be retrieved from meta data in respect of the style palette already stored in an assert library of the design application (e.g., in data storage 116).

At step 708, the design processing module 122 processes the native design elements and converts one or more native design elements into corresponding descriptive design elements. In particular, in this example, native text type elements, native shape type elements and native media type elements are considered relevant to the descriptive representation of the design and thus, are converted from a native format into respective descriptive design elements.

At step 710, in respect of a particular native design element, the design processing module 122 determines if the element is a native text element. If the currently processed native element is a text type element (i.e., Yes at step 710), the method proceeds to step 712 wherein the design processing module 122 converts the native text element into a descriptive text element by extracting the values for the relevant attribute fields from the native text element, for example, the element ID, text content, position, font-size, style, etc. and storing each of these values alongside (or in association with) a textual natural language description of the value. For example, a native text type element of {"1"; "text"; "4,0.5"; "2,1"; "0"; "1"; "TITLE"; "Arial"; "12"; "#111111;" bold"} may be converted into a descriptive text type element of {"element id": "1", "element type": "text", "content": "Body text body text body text body text body text body text", "font": "Arial", "font-size": "9", "font-colour": "#111111", "font-style": "italics", "position": "0,2"}, wherein each field includes a natural language label alongside its respective value. Furthermore, information not relevant to descriptively representing the design element is omitted from the descriptive design element.

Once the native text type element has been converted into a descriptive text type element, the method proceeds to step 724 wherein the converted text type element is stored in a descriptive design data record corresponding to the native design. The descriptive design data record may be a set of descriptive design elements which provide a descriptive representation of the design, and may be stored in the data storage 116. The method 700 then proceeds to step 722, where if any native design elements remain for processing (i.e., Yes), the method loops back up to step 708 and processes the next native design element.

If the currently processed native design element is not a text type element (i.e., No at step 710), the method proceeds to step 714 wherein the design processing module 122 determines if the native design element is a native shape type element. If the currently processed native element is a shape type element (i.e., Yes at step 714), the method proceeds to step 716 wherein the design processing module 122 converts the native shape type element into a descriptive shape type element by extracting the values for the relevant attribute fields from the native element, for example, the element ID, shape type, position, fill colour, line colour, etc. and storing each of these values alongside a textual natural language description of the value. For example, a native shape type element of {"3"; "shape"; "0.5,8"; "10,1"; "0"; "1"; "rect-angle"; "#111111"; "#011e00"} may be converted into a descriptive shape type element of {"element id": "3", "element type": "shape", "shape type": "rectangle", "dimensions": "10,1", "line colour": "#111111", "fill colour": "#737373", "position": "0.5,8"}, wherein each field includes a natural language label alongside its respective value and information not relevant to descriptively representing the design element is omitted form the descriptive design element.

Similarly, once the native shape type element has been converted into a descriptive shape type element, the method proceeds to step 724 wherein the converted shape type element is stored in the descriptive design data record corresponding to the design. The method again proceeds to step 722, where if any native design elements remain for processing (i.e., Yes), the method loops back up to step 708 and processes the next native design element.

If the currently processed native design element is not a text type element (i.e., No at step 710) and not a shape type element (i.e., No at step 714), the method proceeds to step 718 wherein the design processing module 122 determines if the native design element is a media shape type element. If the currently processed native element is a media type element (i.e., Yes at step 718), the method proceeds to step 720 wherein the design processing module 122 converts the native media type element into a descriptive media type element by extracting the values for the relevant attribute fields from the native element, for example, the element ID, media type and position. Additionally, for media items (e.g., images, videos, etc.) their content may be represented by an assetID corresponding to a media item asset in an asset library. Such an assetID is an efficient means for referencing and retrieving the relevant media item but does not provide a descriptive representation of the media item. Accordingly, when converting native media type elements into descriptive media type elements, instead of storing their content or assetID directly, the design processing module 122 is configured to store a textual description of the media item and/or keywords in respect of the media item. The description and/or keywords may be retrieved from an existing asset metadata library. Additionally, or alternatively, image recognition and/or image to text processing techniques may be applied. The values, content description and/or keywords for the descriptive media element are stored alongside a textual natural language description of the value. For example, a native media type element of {"2"; "IMAGE"; "6,2"; "4.5, 5"; "0"; "1"; "MAEp5sX6iBw"} may be converted into a descriptive media type element of {element id": "2", "element type": "Media", "media type": "image", "image description": "Boxer Dog Wearing Sunglasses", "image keywords": ["dog", "boxer", "canine", "portrait", "pet"], "image type": "photo", "position": "6,2"}, wherein each field includes a natural language label alongside its respective value and information not relevant to descriptively representing the design element is omitted from the descriptive design element. Advantageously, by representing the content of the media element with a textual description, the descriptive media type element is suitable for processing by an LLM.

Again, similarly, after the native media type element has been converted into a descriptive media type element, the method proceeds to step 724 wherein the converted media type element is stored in the descriptive design data record corresponding to the design. The method again proceeds to step 722, where if any native design elements remain for processing (i.e., Yes), the method loops back up to step 708 and processes the next native design element. The method 700 may repeat until no further native design elements remain for processing (i.e., No at step 722), after which the method ends. Upon completion of method 700, the descriptive design data record includes descriptive representations of the relevant native elements in the design.

An example of a descriptive design data record, after completion of method 700 is displayed below:

| | |
|---|---|
| Descriptive design data ID | "d32142" |
| Descriptive design element 1 | {"element id": "1", "element type": "text", "content": "Body text body text body text body text body text", "font": "Arial", "font-size": "9", "font-colour": "#111111", "font-style": "italics", "position": "0,2"} |
| Descriptive design element 2 | {"element id": "2", "element type": "Media", "media type": "image", "image description": "Boxer Dog Wearing Sunglasses", "image keywords": ["dog", "boxer", "canine", "portrait", "pet"], "image type": "photo", "position": "6,2"} |
| Descriptive design element 3 | {"element id": "3", "element type": "shape", "shape type": "rectangle", "dimensions": "10,1", "line colour": "#111111", "fill colour": "#737373", "position": "0.5,8"} |
| . . . | . . . |
| Descriptive design element n | {"element id": "n". . . } |

The descriptive design data record may then be stored as the current descriptive design data in respect of a current conversation instance record.

The example of method 700 is in respect of converting native background, style, text type, shape type and media type elements. However, additional and/or alternative design elements may be converted from a native format to a descriptive format as part of converting native design data to descriptive design data. Furthermore, whilst steps 708-724 of method 700 are illustrated as a loop of sequential decisions and steps, alternative implementations for converting native design data into descriptive design data are possible. For example, it is also possible to process and convert native design elements in parallel, in batches, and/or in alternative sequences. In alternative embodiments, the native design data may be parsed, as a whole, and converted into respective descriptive design elements by extracting and storing the values of particular attribute fields alongside (or in association with) natural language labels for the respective attribute fields.

Figure 8:
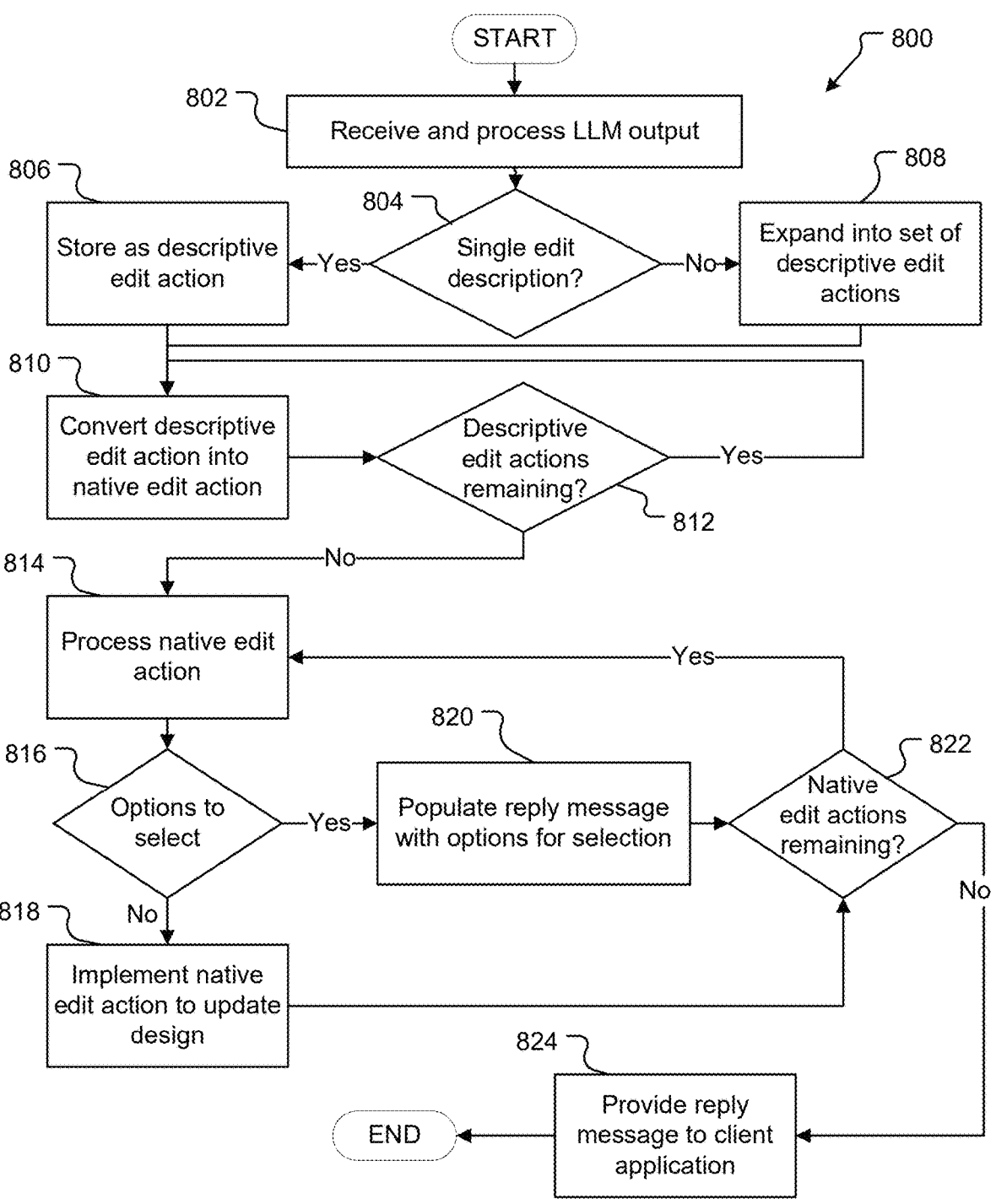
FIG. 8 is a process flowchart depicting an example method for processing edit descriptions and implementing edit actions.

Referring to FIG. 8 a computer implemented method 800 for processing an LLM output, identifying an edit description, processing and storing the edit description as one or more descriptive edit actions, converting the descriptive edit action(s) into native edit action(s); and implementing the native edit action(s) will now be described. Method 800 commences at step 802 wherein the interaction module 124 receives and processes the LLM output. The LLM output may be received as at step 610 of method 600. Processing the LLM output at step 802 includes identifying and storing the components of the LLM output. The components of the LLM output may include a reply message component; a single edit description component or multi edit description component; and a quick response suggestions component. The interaction module 124 is configured to parse the output of the LLM, identify the respective components in the output and store the respective components. Method 800 generally assumes the LLM output includes a single or multi edit description, requiring one or more edit actions. In the case that no edit actions are required, for example, the interaction module 124 processes the LLM output and only identifies the reply message and the quick response suggestions, the method may skip directly to step 824, where the reply message and quick response options are provided to the user application 142.

At step 804, the interaction module 124 determines whether the edit description included in the LLM output is a single edit description or a multi edit description. The interaction module 124 may identify a single edit description by recognising the structure of a descriptive design edit action in the LLM output. The interaction module 124 may identify a multi edit description by recognising the structure of a descriptive summary of multiple edits in the LLM output. Additionally, or alternatively, the interaction module 124 may identify a flag or keyword, included in the LLM output, for respectively indicating a single or multi edit description. If at step 804, the interaction module 124 determines the LLM output includes a single edit description (i.e., Yes), the method proceeds to step 806.

At step 806, the interaction module 124 is configured to store the single edit description, output by the LLM, as a descriptive edit action. The configuration of the LLM may be such that the single edit description is output in a format (e.g., the defined descriptive edit action format) suitable for the relevant component of the LLM output to be extracted and stored directly as a descriptive edit action. That is, the single edit description, as output by the LLM, may effectively be a descriptive edit action suitable for providing directly to the edit action module 128. Additionally, or alternatively, the text corresponding to the single edit description may be extracted from the LLM output and processed by the interaction module 124 to identify particular actions, elements, attributes and values which are stored according to the defined descriptive edit action format. An example process for parsing the single edit description component of the LLM output and storing a descriptive design edit action is described in further detail below, with reference to FIG. 9. The descriptive edit action is then passed to the edit action module 128.

If at step 804, the edit description is not a single edit description (i.e., No) and is instead a multi edit description, the interaction module 124 passes the multi edit description to the edit expansion module 126 and the method proceeds to step 808.

At step 808, the edit expansion module 126 processes the multi edit description and expands the descriptive summary of the multiple edits into a set of descriptive edit actions. In overview, the edit expansion module 126 may process (e.g., parse) the multi edit description and identify action(s); element(s); attribute(s); and value(s) respectively included in the multi edit description. The edit expansion module 126 may generate a descriptive edit action for each identified action in respect of each identified element. Additionally, or alternatively, the edit expansion module 126 may communicate with the ML system 130 in order to expand the multi edit description into a set of descriptive edit actions. In overview, the edit expansion module 126 may provide the multi edit description and (expansion) configuration data to the ML system 130. The ML system 130 may then output a set of single edit descriptions based on the multi edit description and expansion configuration data. The edit expansion module 126 may process the set of single edit descriptions and store each of the single edit descriptions as respective descriptive edit actions. The process of expanding multi edit descriptions into a set of descriptive edit actions is described in further detail below, with reference to FIG. 10. The edit expansion module 126 passes the set of descriptive edit actions to the edit action module 128.

At step 810, whether received from the interaction module 124 or the edit expansion module 126, the edit action module 128 is configured to iterate through the description edit action(s) and convert the (or each) descriptive edit action into a native edit action. An example process for converting each descriptive edit action into a native edit action is described in further detail below, with reference to FIG. 11. At step 812, it is determined whether there are any descriptive edit actions remaining, if 'Yes', the method 800 loops back to step 810 to continue iterating or, if 'No', the method 800 proceeds to step 814.

At step 814, the edit action module 128 is configured to process the (or each) native edit action. In overview, processing a native edit action includes identifying if the action includes options for selection and if so, populating a reply message with options for selection (and subsequent implementation in respect of the selected option) or, if not, implementing the native edit action to update the design; and providing the reply message (e.g., commenting on the update and/or providing options for selection) to the client application.

At step 816, the edit action module 128 determines if the native edit action includes (or is associated with or indicates) options to select from. For example, the edit action module 128 may determine whether the native edit action includes a placeholder new attribute variable and a set of options to select as the new attribute value. Alternatively, a set of like native edit actions for each option may be generated. Alternatively, the native edit action may be to update an element without providing (or requiring selection of) any options.

If there are no options to select (i.e., No at step 816), the method proceeds to step 818 where the edit action module 128 implements the native edit action to update the design. The native edit action is compatible with the functions of the design application. For example, the native edit action may call (or be suitable for calling) an API of the design application to update the design. Accordingly, implementing the native edit action may include executing the native edit action to cause updating (e.g., adding, deleting, modifying, etc.) of one or more native design elements in the design. Implementing the native edit action and updating the design may include updating the native design data and providing the updated native design data to the client application 142 to cause display of the updated design to the user.

If there are options to select in the native edit action (i.e., Yes at step 816), the method proceeds to step 820 and the edit action module 128 populates a reply message with the options for the new attribute value in respect of the current edit action. For example, the edit action module 128 may populate a field of the conversation instance record to include the options.

An example of a conversation instance record at this stage is displayed below:

| | |
|---|---|
| Conversation instance ID | "i1234" |
| User input message | "{Please change the title to "New Title" and suggest options for a new image"}" |
| Current descriptive design data | [{Descriptive design element 1}, . . . (Descriptive design element n}] |
| LLM Output | [{"<Reply text>"}, {"<Single edit description>" or "<Multi edit description>"}; "<Quick response suggestions>"}] |
| Descriptive edit actions | [Descriptive edit action 1}, . . . {Descriptive edit action n}] |
| Native edit actions | [Native edit action 1}, . . . {Native edit action n}] |
| Reply message | [{"<Reply text>"}, {[edit action 1: option 1, . . . edit action 1: option n]}, {"<Quick response suggestions>"}] |

In the above example, the reply message for eventually providing to the client application has been populated with the "Reply text" and "Quick response suggestions" as output by the LLM, along with the options for selection in respect of, in this case, edit option 1. The options may be populated into a <PLACEHOLDER> included in the "<Reply text>" of the LLM output. The configuration data may provide for a default number of options, for example, four options, although any desired number of options may be provided for selection, for example, based on a number requested in the user input message. The method 800 continues to step 822 before the reply message is provided to the client application.

At step 822, the edit action module 128 determines if there are any native edit actions remaining to process. For example, a multi edit description would result in a set of several native edit actions for processing as part of a single conversation instance. If there are native edit actions remaining (i.e., Yes), the method 800 loops back to step 814 to process the next native edit action (e.g., in accordance with steps 814-820). Once all native edit actions have been processed (i.e., No at step 822) and thus the native edit action(s) implemented, or their options populated into a reply message for selection and implementation, the method proceeds to step 824.

At step 824, the interaction module 124 (and/or edit action module 128) provides the reply message, including the LLM output reply text; any edit options for selection; and quick response suggestions, to the client application 142. The reply message may thus be displayed to the user, for example on display 218 of client system 140, in the conversation area 422 of the GUI 400, as a user interface of application 142. Where the reply message includes options for selection, the user may select an option, and the design may be updated in accordance with the selected option and corresponding native edit action.

Figure 9:
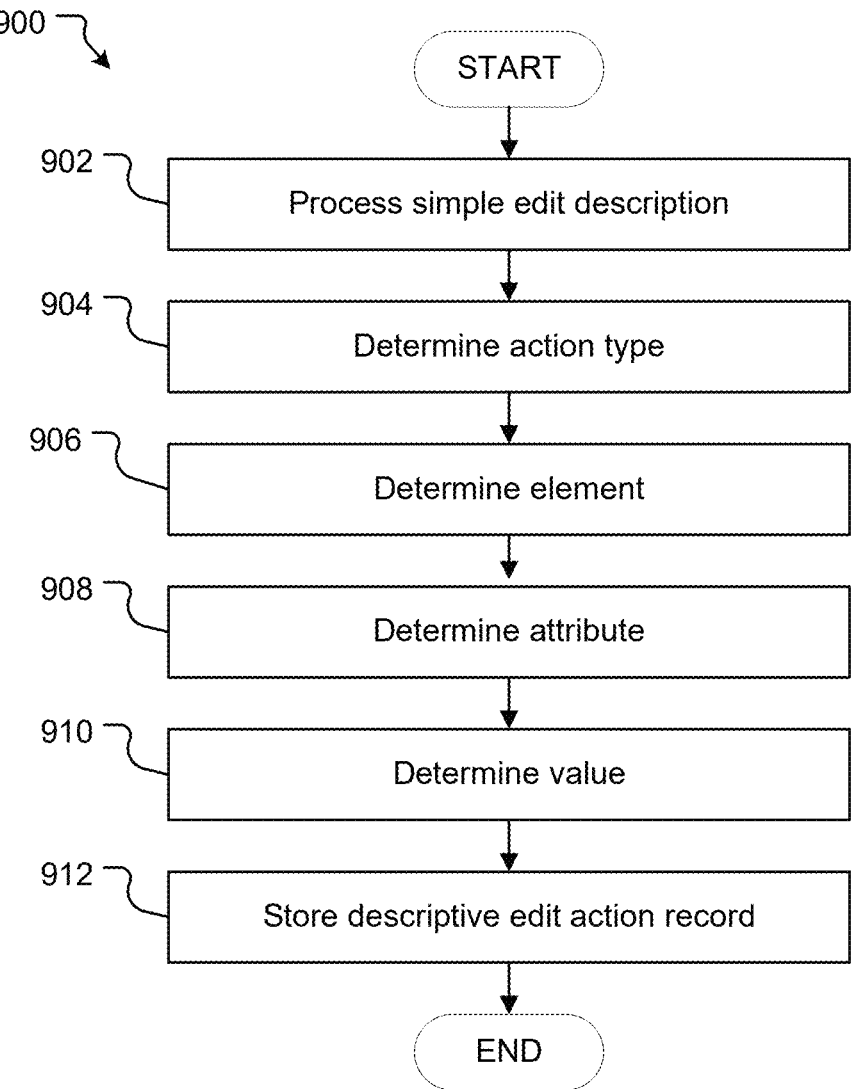
FIG. 9 is a process flowchart depicting an example method for processing and storing descriptive format edit actions.

Referring to FIG. 9, a computer implemented method 900 for processing and storing descriptive edit actions will now be described. The method 900 may be performed as part of steps 802 to 806 of method 800. In some embodiments, the single edit description output by the LLM may be suitable for storing directly as a descriptive edit action and/or immediately providing to the edit action module 128 for conversion into a native edit action. Additionally, or alternatively, method 900 may be implemented to process single edit descriptions, identify their components, and store the single edit description as a descriptive edit action with discrete components. The interaction module 124 may receive a single edit description (e.g., as a component output from an LLM and/or from a conversation instance record).

At step 902, the interaction module 124 processes the single edit description based on the defined descriptive edit action format and the current descriptive design data. In overview, the interaction module is configured to identify the action type of edit being described; the element being edited; and which if any attributes are being edited. For example, the interaction module 124 may parse the single edit description and identify components and properties based on the presence of keywords corresponding to the defined descriptive edit action format. The interaction module 124 may also determine if the edit is in respect of text content or values (which are inherently represented textually) or in respect of asset type content, such as media items or style palettes (which may be represented by asset IDs and textually described in metadata). Furthermore, the interaction module 124 may determine if the single edit description calls for any options for selection.

At step 904, the interaction module 124 determines the action type of the single edit description. The interaction module 124 may parse the single edit description output by the LLM and determine the action type based on the presence of keywords in the edit description which correspond to action types defined in the descriptive edit action format. For example, based on the presence of "DELETE", "CREATE" or "UPDATE" in the single edit description, the interaction module 124 may respectively determine an action type of a delete type action, a create type action or an update type action. The action type may be stored in a descriptive edit action record created in respect of the single edit description.

At step 906, the interaction module 124 determines the element referenced in the single edit description. The interaction module 124 may parse the single edit description output by the LLM and determine the ID of the element referenced. For example, based on the presence of "id": "n" or "element: n", in the single edit description, the interaction module may determine the integer "n" as the element ID of the referenced element. The element ID may be stored in the descriptive edit action record in respect of the single edit description.

At step 908, the interaction module 124 determines the attribute field(s), if any, referenced in the single edit description. The interaction module 124 may parse the single edit description output by the LLM and identify the presence of attribute field keywords based on the determined action type, element and the descriptive edit action format. For example, whilst a delete type edit action may only require an element ID to delete the referenced element, a create type edit action may require attribute values corresponding to the element type being created. For example, creating a new text element may require text content to be specified, whereas creating a new media type element may require a description and/or keywords for retrieving a media item to be specified. As another example, an update type edit action may require a particular attribute, of an element, to be specified for updating. The interaction module 124 may set unspecified (optional) attributes as default values. Where a required attribute is not identified as a field in the single edit description, the interaction module 124 may return an error flag which causes an error reply and/or request for clarifying information to be included in the reply text eventually provided to the user. The attribute(s) may be stored in the descriptive edit action record in respect of the single edit description.

At step 910, the interaction module 124 determines the value(s), if any, referenced in the single edit description. The interaction module 124 may parse the single edit description output by the LLM and identify the presence of values corresponding to the attributes identified in step 908 and the defined descriptive edit action format. Where an expected value is not provided in the single edit action, the interaction module 124 may utilise a default value or return an error flag which causes an error reply and/or request for clarifying information to be included in the reply text eventually provided to the user.

To assist in understanding method 900, an example of two single edit descriptions, which may respectively be received as an LLM output in separate (e.g., as at step 610 of method 600), are provided below.

| Example single edit description 1 | Example single edit description 2 |
|---|---|
| "create_or_modify_elements": {<br>"action_type": "UPDATE"<br>"id": "0", | "create_or_modify_elements": {<br>"action_type": "CREATE",<br>"element_type": "media" |

-continued

| Example single edit description 1 | Example single edit description 2 |
|---|---|
| "content": "New Title"<br>} | "media type": "image"<br>"description": "cat wearing<br>a party hat"<br>"keywords": ["cat", "pet",<br>"party", "hat"]<br>} |

The method 900 may process the example single edit descriptions 1 and 2 and store the respective example single edit descriptions as descriptive edit action records as below:

| Example descriptive edit action record 1 | | Example descriptive edit action record 2 | |
|---|---|---|---|
| Action type | "action_type": "UPDATE" | Action type | "action_type": "CREATE" |
| Element | "element id": "0" | Element | "element id": "n++" |
| Attribute(s) | "attribute": "content" | Attribute(s) | "attributes": "["media type", "description", "keywords"]" |
| Value(s) | value": {"content": "New Title"} | Value(s) | "Values": ["media type": "image", "description": "cat wearing a party hat", "keywords": ["cat", "pet", "party", "hat"]"} |

In the above, each of the descriptive edit actions do not include any options for selection. Where the user input message, single edit description and/or LLM output indicates a selection of options is required, the value(s) in respect of an attribute being edited may be a set (e.g., an array of values for selection). For example, in respect of Example descriptive edit action record 1, the value(s) may include a set of different instances of text content for selection as the new title. Similarly, for example descriptive edit action record 2, the value(s) may include a set of different descriptions and keywords for use in retrieving a media item. Alternatively, where options for selection of an asset (such as a media item, style palette, etc.) are required, the same description and/or keywords may be used to search an asset library and a required number of assets retrieved from the search results, for use as options.

At step 912, the descriptive edit action record may be stored, for example as a descriptive edit action in a set of descriptive edit actions of a current conversation instance record.

Figure 10:
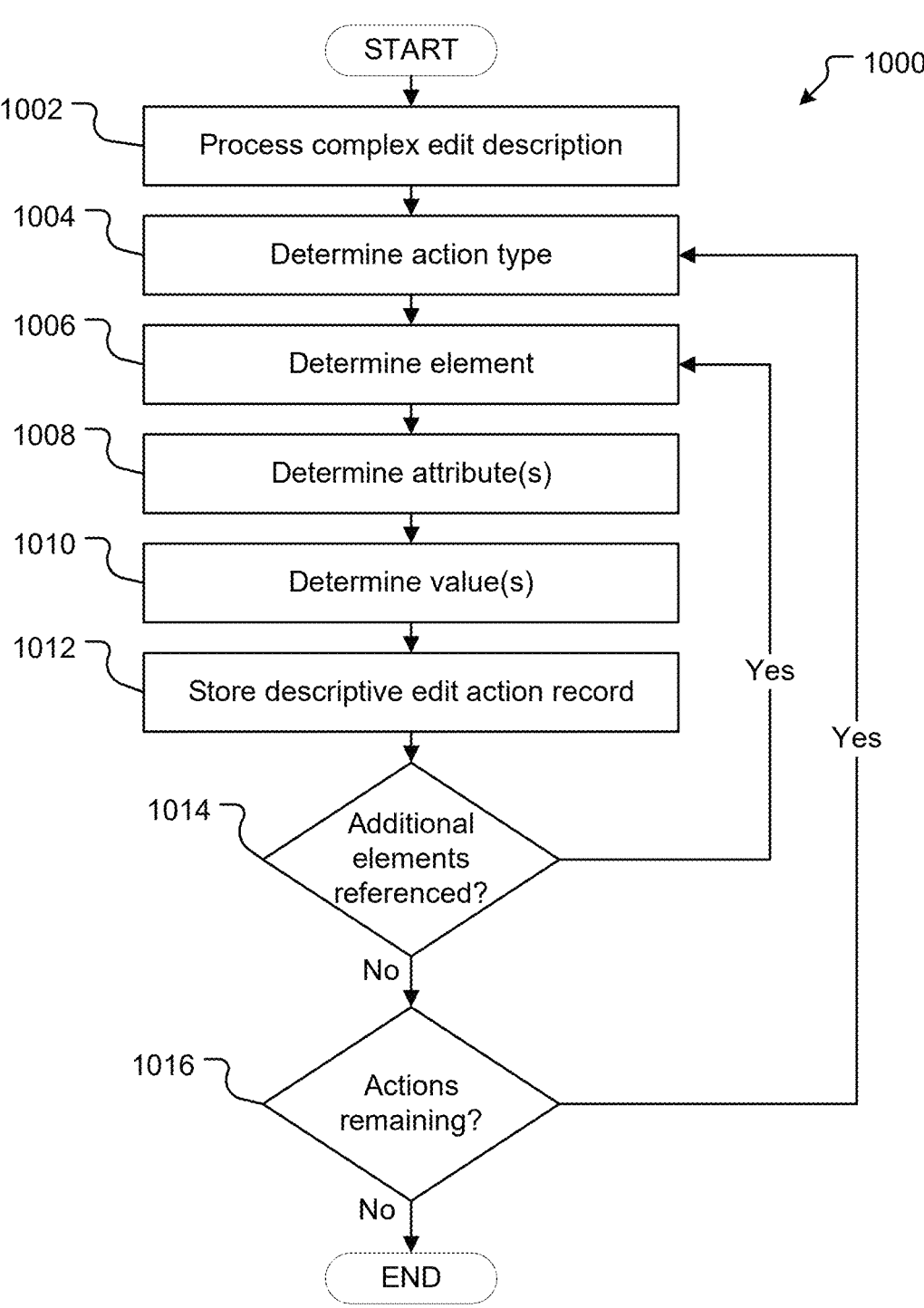
FIG. 10 is a process flowchart depicting an example method for converting a multi edit description into a set of descriptive edit actions.

Referring to FIG. 10, a computer implemented method 1000 for expanding a multi edit description into a set of descriptive edit actions will now be described. The method 1000 may be performed as (or as part of) step 808 of method 800. In some embodiments, the edit expansion module 126 may be configured to parse a multi edit description (e.g., as received in an LLM output as at step 610 of method 600), describing multiple edits, and determine the actions, elements, attributes, and values in respect of each of the multiple edits.

At step 1002, the edit expansion module 126 processes the multi edit description based on the defined descriptive edit action format and the current descriptive design data. The edit action module identifies the edit actions (and their) in the multi edit description, the elements being edited, and which if any attributes are being edited in respect of each edit. For example, the edit expansion module 126 may parse the multi edit description and identify actions, elements, attributes, and values based on keywords corresponding to the defined descriptive edit action format.

At step 1004, the edit expansion module 126 determines an edit action type in the multi edit description, for example, based on the presence of a keyword in the multi edit description corresponding to an edit action type defined in the descriptive edit action format. At step 1006, the edit expansion module 126 determines an element ID in respect of the action type, for example, based on the presence of an element ID referenced by the action type. At step 1008, the edit expansion module 126 determines any attribute field(s) referenced by the action type, for example, based on attributes expected to be updated by the determined action type in respect of the determined element, according to the descriptive edit action format. At step 1010, the edit expansion module 126 determines corresponding values in respect of the determined attributes, according to the descriptive edit action format.

At step 1012, the action type, element, attribute(s) and value(s) are stored as a descriptive edit action, for example, in a descriptive edit action record. In some embodiments, the descriptive edit action may be stored as a single text string suitable for passing to the edit action module 128. In alternative embodiments, the descriptive edit action may be stored with discrete components.

Using the example of "Delete element 0 and 4. Change the background colour to a dark forest green. Replace the image of a dog wearing sunglasses with a photo of a cat wearing a part hat." as a multi edit description, the initial processing steps of a first loop of steps 1004-1012 may result in a descriptive edit action record of:

| Descriptive edit action record | |
|---|---|
| Descriptive edit action ID | 1 |
| Action type | "action_type": "DELETE" |
| Element | "element id": "0" |

In this example, the edit expansion module is configured to generate a first descriptive edit action record (i.e., descriptive edit action 1) including an action type of "DELETE" in respect of element 0 based on the keywords identified in "Delete element 0 and 4" of the multi edit description. Because the delete action type does not require specifying any attributes or values, no attributes or values are included in the descriptive edit action 1 record.

Because a multi edit description may describe an edit action in respect of multiple elements (e.g., "Delete element 0 and 4") and/or multiple edit actions (e.g., "delete" and "replace"), at step 1014 the edit expansion module is configured to determine if any additional elements are referenced. For example, the edit expansion module 126 may parse the multi edit description and determine if additional elements are referenced by the current edit action by identifying terms such as "element X and Y", "all image elements", or "these elements" (e.g., where the current user element selection state is included in the conversation instance record). If additional elements are referenced by the multi edit description, the method loops back to step 1006 and determines the additional element referenced.

In the example multi edit description including "delete element 0 and 4" a second iteration of steps 1006-1012 may result in a descriptive edit action record of:

| Descriptive edit action record | |
|---|---|
| Descriptive edit action ID | 2 |
| Action type | "action_type": "DELETE" |
| Element | "element id": "4" |

In this example, the edit expansion module 126 has generated a second descriptive edit action record (i.e., descriptive edit action 2) including an action type of "DELETE", now in respect of element 4.

If no further elements are referenced by the currently processed action (i.e., no at step 1014), the method proceeds to step 1016. At step 1016, the edit expansion module determines if any unprocessed actions are remaining in the multi edit description. If there are actions remaining (i.e., Yes at step 1016), the method loops back up to step 1004 and determines the action type of the further action.

Continuing the example of "Delete element 0 and 4. Change the background colour to a dark forest green. Replace the image of a dog wearing sunglasses with a photo of a cat wearing a part hat." as a multi edit description, the further loops of processing steps 1004-1014 may result in a descriptive edits action records of:

| Descriptive edit action ID | 3 | Descriptive edit action ID | 4 |
|---|---|---|---|
| Action type | "action_type": "UPDATE" | Action type | "action_type": "UPDATE" |
| Element | "element id": "background" | Element | "element id": "2" |
| Attribute(s) | "null" | Attribute(s) | "attributes": "["media type", "description", "keywords"]" |
| Value(s) | "value": {"background": "#1e8239"} | Value(s) | "Values": ["media type": "photo", "description": "front on photo of a cat wearing a party hat", "keywords": ["cat", "party", "hat"]"} |

In this example, the edit expansion module 126 has generated a third descriptive edit action record (i.e., descriptive edit action 3) including an action type of "UPDATE", in respect of the background. Because, in the defined descriptive edit action format and descriptive design data format, the background element is referenced by the id "background" and only has a background content attribute, no attribute value is needed. Instead the value to update is descriptively represented as "background": "#1e8239", wherein "#1e8239" is a hex code corresponding to dark forest green. The hex code may be retrieved by the edit expansion module from a library of colour hex codes based on descriptive meta data for the hex code corresponding to, in this instance, "dark forest green". Additionally, a fourth descriptive edit action record (i.e., descriptive edit action 4) has been generated including an action type of "UPDATE" in respect of element 2 and including the necessary attribute fields and corresponding values to perform the update. The element ID of 2 may be identified on the basis of the descriptive design data including a descriptive element of an image type element having the element ID 2. Here it may be noted that, for example, if multiple image type elements were included in descriptive design data, the LLM may be configured such that the multi edit description of the LLM output would specify the element ID of the intended image element for editing. In the case where a user message includes a request to update an element and it is unclear tion of the task (e.g., to expand a description of multiple edits into a set of descriptive edit actions), parameters for the task (e.g., input and output format, design format, edit action format, tone of the output, rules, etc.). As a general example, the expansion configuration data may be (or include) an expansion configuration prompt as below, wherein the "design" refers to the descriptive design data and the "edit summary" refers to the multi edit description:

| | |
|---|---|
| Description of task: | Expand a descriptive edit summary of multiple edits in respect of a design into a set of individual descriptive edit actions. Provide the descriptive edit actions according to the defined format. |
| Parameters: | "The design includes a background, a style, and a set of text type, shape type, and/or media type elements. The elements include respective attributes according to their type." |
| | "The edit summary includes a description of multiple edits to design elements of the design." |
| | "Each descriptive design action is a single edit action in respect of single design element according to the defined format." |
| | "Descriptive edit actions: <DESCRIPTIVE EDIT ACTION FORMAT>" |
| | "the design: <DESCRIPTIVE DESIGN DATA>" |
| | "the edit summary: <MULTI EDIT DESCRIPTION>" | which element is being referenced, the LLM is configured to provide a reply message to the user seeking additional information before generating a multi edit description.

Once each of the edits described in a multi edit description are expanded into (and stored as) descriptive edit action records, the method 1000 ends. The descriptive edit action records may then be stored as descriptive edit actions in respect of a conversation instance record.

Whilst the above description of method 1000 is in respect of the edit expansion module 126 itself processing and expanding a multi edit description. Additionally, or alternatively, the edit expansion module 126 may leverage the ML system 130 to expand the multi edit description into a set of descriptive edit actions. In particular, the edit expansion module 126 may be configured to communicate with the ML system 130 to facilitate edit expansions. In this example the ML system 130 may implement a general purpose LLM for expanding the multi edit description. For ease of explanation, the LLM when communicating with the edit expansion module 126 will be referred to as the expansion LLM. The expansion LLM may be the same (or a different LLM) as the LLM which the interaction module 124 communicates with. The expansion LLM may be a separate instance and/or separate context window to that communicated with by the interaction module 124. In alternative embodiments, additional and/or alternative models and configurations of the ML system 130 are possible.

The edit expansion module 126 may be configured to provide a multi edit description (e.g., as received in an LLM output as at step 610 of method 600) along with (expansion) configuration data to the expansion LLM. Alternatively, the expansion LLM may be configured (with configuration data, e.g., a system prompt) in advance and the multi edit description subsequently provided to the expansion LLM. The expansion configuration data configures the expansion LLM to process the input multi edit description (and descriptive design data) and to output a set of descriptive edit actions.

In one example, the expansion configuration data may take the form of an expansion configuration prompt for passing to the expansion LLM along with (or in advance of) providing the user message and descriptive design data. The expansion configuration prompt may include a brief descrip- It will be appreciated that the expansion configuration data may include many alternative configuration prompt components. For example, the expansion configuration data may also include one or more (some-shot) examples of input multi edit descriptions and examples of descriptive edit actions the expansion LLM is expected to output based on the inputs. In one example, the configuration data may be (or include) a single pre-assembled prompt—e.g. a string that includes all the relevant configuration components. Alternatively, separate configuration prompts may be generated including separate components and combinations thereof. The ML system 130 can thus be configured as an expansion LLM by providing the expansion configuration data as a prompt, part of a prompt, or a series of prompts.

In the above example of a configuration prompt, the <DESCRIPTIVE EDIT ACTION FORMAT>; the <DESCRIPTIVE DESIGN DATA>; and <MULTI EDIT DESCRIPTION> are placeholders that may be populated with the relevant descriptive design data of the design and the relevant multi edit description when provided to the expansion LLM. The descriptive edit action format provided to the expansion LLM may be the same as that provided to the interaction LLM. Accordingly, where the interaction LLM is configured to generate replies to a user to interact with the user in a conversational manner in addition to generating single edit descriptions, the expansion LLM is configured only to expand multi edit descriptions into a set of descriptive edit actions. The more specifically focused task of the expansion LLM may provide that it is more able to suitably process multiple edits and generate descriptive edit actions in a format suitable to be submitted directly to the edit action module 128.

In some embodiments, the set of descriptive edit actions output by the expansion LLM may be received and stored (by the edit expansion module 126) as a single string of text including the entire set of descriptive edit actions. Additionally, or alternatively, the set of descriptive edit actions output by the expansion LLM may be treated as a set of single edit descriptions and each single edit description processed and stored as a respective descriptive edit action in a method substantially similar to method 900. The set of descriptive edit actions (e.g., as discrete edit actions or a wholistic single string) may be passed to the edit action module 128 for respectively converting into corresponding native edit actions.

Figure 11:
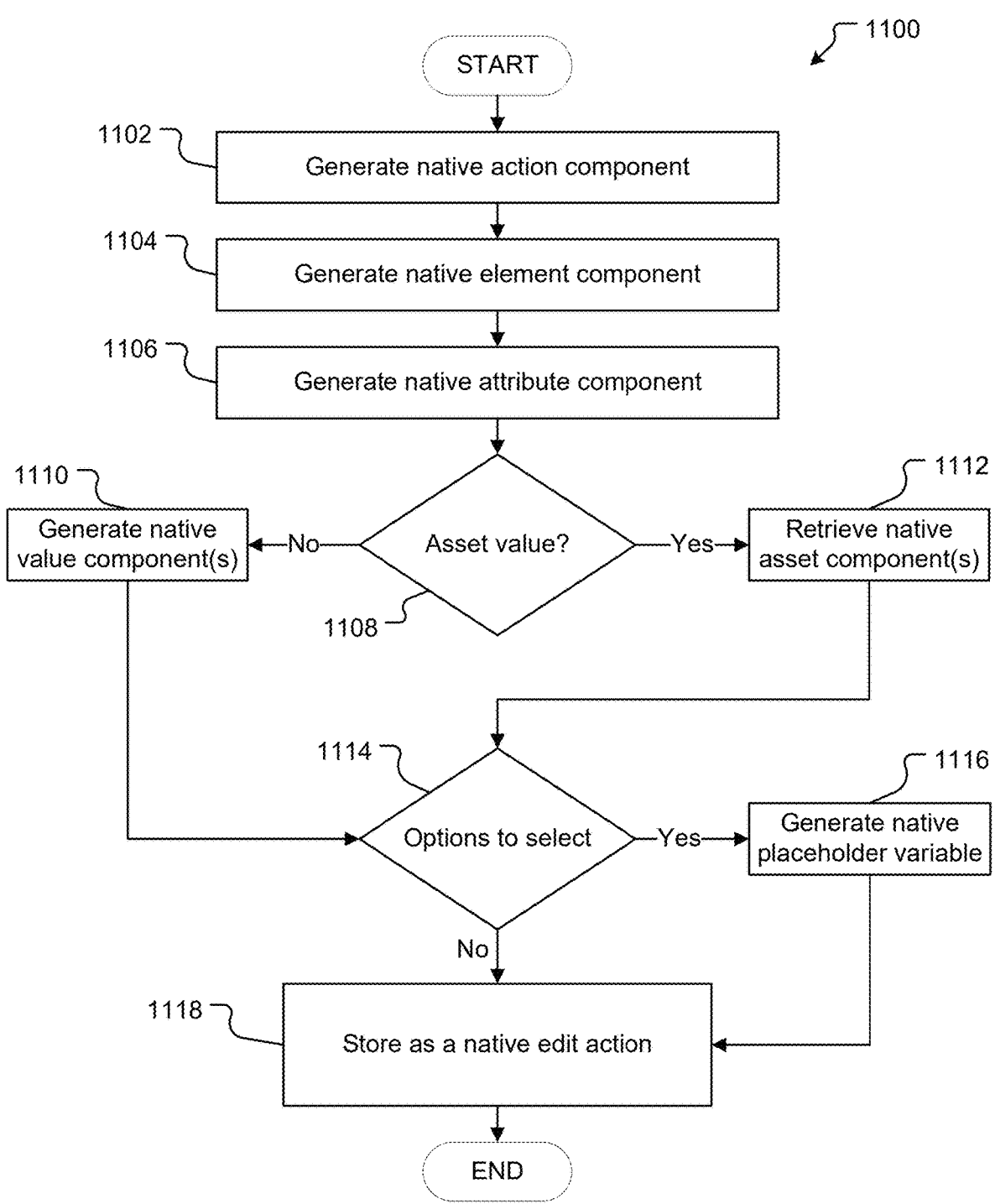
FIG. 11 is a process flowchart depicting an example method for converting edit actions from a descriptive format into a native format.

Referring to FIG. 11, a computer implemented method 1100 for converting descriptive edits actions in a descriptive format into native edit actions in a native format will now be described. The method 1100 may be performed as (or as part of) step 810 of method 800. In method 1100, the edit action module 128 may access one or more descriptive edit actions. For example, the edit action module 128 may receive a descriptive edit action record (or single edit action as output by the interaction LLM as a descriptive edit action) from the interaction module 124; may receive a set of descriptive edit action records (or a set of descriptive edit actions as output by the expansion LLM) from the edit expansion module 126; and/or may retrieve descriptive edit action records stored in a conversation instance record. To convert each descriptive edit action into a native edit action, the edit action module 128 processes the descriptive edit action and performs the steps of method 1100.

At step 1102, the edit action module 128 generates a native action component based on the action type component of the descriptive edit action, and the defined structure of the descriptive edit action format. The native action component is a representation of the action type in a format native to the design application. That is, the native action component defines an edit action (e.g., an API or method call) compatible with the native design application for causing the intended edit action to update the native design. The native action component may be stored in a native edit action record in respect of the corresponding descriptive edit action.

At step 1104, the edit action module 128 generates a native element component based on the element component of the descriptive edit action, and the defined structure of the descriptive edit action format. In particular the edit action module 128 can convert a descriptive element ID identifying a descriptive element into a native element ID. The native element ID refers to a native element (corresponding to the descriptive design element) in the native design data. The native element component (e.g., the native element ID) may be stored in the native edit action record.

At step 1106, the edit action module 128 generates a native attribute component based on the attribute component of the descriptive edit action, and the defined structure of the descriptive edit action format. The native attribute component is a representation of the attribute in a format native to the design application. That is, the native attribute component defines an attribute (e.g., a field) of native design data corresponding to the attribute described in the descriptive edit action. Where a descriptive edit action includes multiple descriptive attributes, generating the native attribute component may include generating multiple corresponding native attributes. The native action component may be stored in a native edit action record in respect of the corresponding descriptive edit action. Where the descriptive attribute edit action does not refer to an attribute, step 1106 may be foregone, or a null value may be generated (and stored) as the native attribute component.

At step 1108, the edit action module determines if the descriptive edit action refers to an asset value. That is, the edit action module determines if the descriptive edit action explicitly describes a textual value (e.g., text content or a numerical or textual value), or provides a description (or keywords) for retrieving an asset (e.g., a style palette or media item). If the descriptive edit action describes a text value (i.e., No at step 1108) the method proceeds to step 1110.

At step 1110, the edit action module 128 generates a native value component based on the value component of the descriptive edit action, and the defined structure of the descriptive edit action format. The native value component refers to a textual value which defines a value of an attribute in a native format. In particular the edit action module 128 can extract the text content, and/or textual or numerical value included in the descriptive edit action as the native value component. Additionally, or alternatively, the descriptive text value may be converted or normalised to generate to native value component. Where the descriptive edit action includes multiple descriptive values, generating the native value component may include generating multiple corresponding native values. The native value component may be stored in the native edit action record. The method then proceeds to step 1114.

If the descriptive edit action provides a description (or keywords) for retrieving an asset (i.e., Yes at step 1108), the method instead proceeds to step 1112.

At step 1112, edit action module 128 is configured to retrieve one or more assets using the description (and/or keywords) included in the descriptive edit action. For example, where the descriptive edit action is in respect of adding an image, step 1112 may involve the edit action module 128 searching an image asset library (e.g., stored in data storage 116) with the description and retrieving the image ID of the image(s) which are most relevant to the description. A similar process may be performed for retrieving a style palette or other asset (from a style asset library or other suitable library). Where the descriptive edit action includes multiple descriptive values, or indicates a selection of options, retrieving the native asset component may include retrieving multiple asset IDs. Whilst this example refers to retrieving asset IDs, in other examples, the asset itself (e.g., an image file rather than an image ID) may be retrieved. The native asset component may be stored in the native edit action record. The method then proceeds to step 1114.

At step 1114, the edit action module 128 determines whether the descriptive edit action includes (or refers to) options for selection. For example, where multiple native values were generated, or native assets retrieved) in the previous steps the edit action module 128 is configured to determine the multiple values (or assets) are options to select (i.e., Yes). Accordingly, the method proceeds to step 1116

At step 1116, edit action module 128 generates a native placeholder variable. The native placeholder variable may be used to generate a native edit action which causes the creation or updating of an element with a variable value in an attribute field, pending the selection of the value. For example, when an image is being updated to one of a selection of images, the native edit action may include a placeholder variable image ID that is replaced by the image ID of a selected image amongst the image options. As outlined above, the images for selection may be included in a reply message provided to the client application 142 and, upon a user selecting an option, the native edit action may cause the respective element to be updated with the selected value. The method then proceeds to step 1118.

Alternatively, if the descriptive edit action does not include (or require) options to select (i.e., No at step 1114), the method proceeds directly to step 1118.

At step 1118, the native components generated based on the corresponding description edit action are stored as a native edit action. Method 1100 then ends. Method 1100 may be performed in respect of each of a set of descriptive edit actions to generate a set of corresponding native edit actions.

To assist with understanding of method 1100, an example of a set of descriptive edit actions and a set of corresponding native edit actions may be as below:

| Descriptive edit actions | Native edit actions |
| --- | --- |
| "actions": [<br>{<br>  "create_or_modify_elements": {<br>    "action_type": "DELETE",<br>    "id": "0"<br>  }<br>},<br>{<br>  "create_or_modify_elements":<br>    "action_type": "DELETE",<br>    "id": "4"<br>  },<br>},<br>{<br>  "create_or_modify_elements": {<br>    "action_type": "UPDATE",<br>    "id": "background"<br>    "background": "#1e8239"<br>  }<br>},<br>{<br>  "create_or_modify_elements": {<br>    "action_type": "UPDATE"<br>    "id": "2"<br>    "media type": "image": {<br>      "description": "front on photo of a<br>      cat wearing a party hat",<br>      "keywords": "cat party hat",<br>      "image type": "PHOTO"<br>    }<br>  }<br>}<br>] | "DesignEditSequentialActions": [<br>  {<br>    "type": "DesignEditElementDelete",<br>    "elementId": "0",<br>    "groupId": "null"<br>  },<br>  {<br>    "type": "DesignEditElementDelete",<br>    "elementId": "4",<br>    "groupId": "null"<br>  },<br>  {<br>    "type": "designEditElementUpdate",<br>    "elementId": "2"<br>    "element_delta": {<br>      "type": "RectElemetDeltaProto",<br>      "image_id": "MAEJkuSKadQ",<br>      "image_version": 1<br>    }<br>  }<br>] |

In the above example, each of 4 descriptive edit actions are converted into corresponding native edit actions, wherein the native edit action is suitable for implementing (e.g., executing in) the design application to apply the described edit and cause the updating of the design. Notably, the descriptive edit action to update a media type element (i.e., element 2) with an image of a photo of cat wearing a party hat has been converted into a native edit action to update the corresponding native element in the design with a suitable image asset (referenced by image ID "MAEJkuSKadQ") retrieved based on the description and keywords. The above is a non-limiting example and many additional and/or alternative edit actions and conversions are also possible. The specific format of the descriptive edit actions will depend on the defined descriptive edit action format and the configuration of the interaction module 124, edit expansion module 126, interaction LLM, and expansion LLM. The specific format of the native edit actions will depend on the configuration of the design application.

Once the descriptive edit actions have been converted into corresponding native edit actions, the native edit actions may be implemented to update the design. Because the descriptive edit actions are generated based on a user input message, descriptive design data, and a defined descriptive edit action format, the implementation of the native edit actions enables updating of the design in accordance with the user input message.

Accordingly, embodiments disclosed herein, including the techniques described above, may provide systems and methods for automatically and intelligently updating designs, within a design application, in a conversational manner. Advantageously a user may conversationally request advice in respect of and changes to their design, and the application 120 may provide conversational replies (including design advice) and implement a wide variety native design actions to cause the user's intended changes to the design. Moreover, by way of the conversational user interface, the user need not be familiar with the use of each particular native feature.

The conversion of a native design representation into a textual descriptive design representation may enable an LLM to process and interpret the design without requiring specific fine tuning of the LLM. Furthermore, the conversion of edit descriptions, output by the LLM, into native edit actions may enable the LLM to provide outputs which may ultimately be implemented to interact with and change a native design, also without requiring specific fine tuning of the LLM. Whilst a single instance of an ML system (e.g., a single instance of an LLM) may be implemented in certain embodiments to facilitate quick and simple edits, in alternative embodiments multiple instances of ML systems (e.g., an interaction LLM and an expansion LLM) may be implemented to separately process particular inputs and provide particular outputs according to respective configurations. Advantageously, the systems and methods may leverage general purpose LLMs without requiring fine tuning. The chained agent (e.g., dual LLM) architecture enables for high quality interaction in user conversation and efficient implementation of single edits whilst also allowing for accurate expansion of more complex edits.

The systems and methods disclosed herein refer, at times, to particular examples of design elements, edit actions and the like. However, such examples are non-limiting and the systems and methods may be scaled and adapted to include alternative or additional design elements, edit actions, and the like. For example, the structure and definition of descriptive design data and descriptive edit actions is extendable to support any additional design elements or edit actions natively included in a design application.

In the above embodiments, the methods 600, 700, 800, 900, 1000 and 1100 are at times described as being performed by server application 120 and/or one or more of the design processing module 122, the interaction module 124, the edit expansion module 126 and/or the edit action module 128. However, in alternative embodiments, the processing described in any (or each) of methods 600, 700, 800, 900, 1000 and/or 1100 may be performed by alternative modules, alternative applications running on computer processing hardware 112 and/or other computer processing systems.

In the above embodiments certain operations are described as being performed by the client system 140 (e.g. under control of the client application 142) and other operations are described as being performed at the server environment 110 or by the machine learning system 130. Variations are, however, possible. For example, in certain cases an operation described as being performed by client system 140 or the machine learning system 130 may be performed at the server environment 110 and, similarly, an operation described as being performed at the server environment 110 may be performed by the client system 140 or the machine learning system 130. Generally speaking, however, where user input is required such user input is initially received at client system 140 (by an input device thereof). Data representing that user input may be processed by one or more applications running on client system 140 or may be communicated to server environment 110 for one or more applications running on the computer processing hardware 112 to process. Similarly, data or information that is to be output by a client system 140 (e.g. via display, speaker, or other output device) will ultimately involve that system 140. The data/information that is output may, however, be generated (or based on data generated) by client application 142 and/or the server environment 110 and/or the machine learning system 130 (and communicated to the client system 140 to be output).

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Where operations are performed in series and/or in loops, they may also be performed in parallel and/or in batches. Still further, the functionality/processing of a given flowchart operation could potentially be performed by (or in conjunction with) different applications running on the same or different computer processing systems.

In the above description, certain operations and features are explicitly described as being optional. This should not be interpreted as indicating that if an operation or feature is not explicitly described as being optional it should be considered essential. Even if an operation or feature is not explicitly described as being optional it may still be optional.

The present disclosure provides various user interface examples. It will be appreciated that alternative user interfaces are possible. Such alternative user interfaces may provide the same or similar user interface features to those described and/or illustrated in different ways, provide additional user interface features to those described and/or illustrated, or omit certain user interface features that have been described and/or illustrated.

Unless otherwise stated, the terms "include" and "comprise" (and variations thereof such as "including", "includes", "comprising", "comprises", "comprised" and the like) are used inclusively and do not exclude further features, components, integers, steps, or elements.

In some instances the present disclosure and/or claims may use the terms "first," "second," (or corresponding numbers) etc. to identify and distinguish between elements or features. When used in this way, these terms are not used in an ordinal sense and are not intended to imply any particular order. For example, a first design element (or element 1) could equally be referred to as a second design element (or element 2) without departing from the scope of the described examples. Furthermore, when used to differentiate elements or features, a second element could exist without a first element or a second element type could occur before a first element.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method for automatically editing a digital design in a design application, the digital design including one or more individual existing design elements, the method including:

receiving a natural language request to edit the digital design, wherein editing the digital design includes adding a design elements to the digital design, or deleting or modifying an existing design elements in the digital design;

accessing a native format representation of the digital design, the native format representation including a native design elements corresponding to the existing design elements;

generating a descriptive format representation of the digital design by converting the native design elements into a descriptive design element;

generating a descriptive edit action based on the request and the descriptive format representation of the digital design, wherein the descriptive edit action is a textual descriptive representation of an edit action natively supported by the design application and wherein the descriptive edit action includes:

a descriptive action component in respect of the descriptive design element or a new descriptive design element;

a descriptive element ID in respect of the descriptive design element or the new descriptive design element; and a descriptive attribute component in respect of the descriptive design element or the new descriptive design element;

converting the descriptive edit action into a native edit action suitable for executing in the design application, wherein converting the descriptive edit action into the native edit action includes:

identifying the descriptive action component in the descriptive edit action and generating a native action component, in respect of a corresponding native design element, based on the descriptive action component;

identifying the descriptive element ID and generating a native element ID, in respect of the corresponding native design element, based on the descriptive element ID; and identifying the descriptive attribute component and generating a native attribute component, in respect of the corresponding native design element, based on the descriptive attribute component; and executing the native edit action, in the design application, to edit the digital design.

2. The computer implemented method of claim 1, wherein generating the descriptive edit action includes:

providing the descriptive format representation of the digital design to a large language model (LLM);

receiving, from the LLM, an edit description; and storing the edit description as the descriptive edit action.

3. The computer implemented method of claim 2, further including providing configuration data to the LLM, wherein the configuration data includes instructions for the LLM to generate the descriptive edit action based on the request and the descriptive format representation of the digital design.

4. The computer implemented method of claim 3, wherein the configuration data includes:

a descriptive edit action format defining the format of descriptive edit actions; and instructions for the LLM to generate the descriptive edit action based on the descriptive edit action format.

5. The computer implemented method of claim 2, further including generating multiple descriptive edit actions, wherein generating the multiple descriptive edit actions includes:

providing the descriptive format representation of the digital design to the LLM;

receiving, from the LLM, a multi edit description; and expanding the multi edit description into the multiple descriptive edit actions.

6. The computer implemented method of claim 5, wherein expanding the multi edit description includes:

providing the multi edit description to a second LLM;

receiving, from the second LLM, a set of multiple edit descriptions; and storing the set of multiple edit descriptions as the multiple descriptive edit actions.

7. The computer implemented method of claim 6, further including providing expansion configuration data to the second LLM, wherein the expansion configuration data includes:

a descriptive edit action format defining the format of descriptive edit actions; and instructions for the second LLM to expand the multi edit description into the set of multiple edit descriptions based on the descriptive edit action format.

8. The computer implemented method of claim 1, wherein the native design elements includes a native attribute field containing a native attribute value; and converting the native design elements into the descriptive design element includes:

converting the native attribute value to a descriptive attribute value; and storing the descriptive attribute value in a descriptive attribute field in association with a natural language label describing the descriptive attribute field.

9. The computer implemented method of claim 8, wherein the native attribute value is a text content value or a numerical value and wherein converting the native attribute value to the descriptive attribute value includes:

extracting the native attribute value from the native design element; and storing the extracted native attribute value as the descriptive attribute value.

10. The computer implemented method of claim 8, wherein the native attribute value is an asset identifier and converting the native attribute value to the descriptive attribute value includes:

accessing a textual description of the asset identified by the asset identifier and storing the textual description as the descriptive attribute value.

11. The computer implemented method of claim 1, wherein the native design elements includes a plurality of native attribute values; and wherein converting the native design elements into the descriptive design element includes converting two or more of the native attribute values into corresponding descriptive attribute values.

12. The computer implemented method of claim 11, wherein converting the native design elements into the descriptive design element further includes omitting one or more other native attribute values, of the plurality of native attribute values, from conversion into corresponding descriptive attribute values.

13. The computer implemented method of claim 1, wherein the native format representation of the digital design includes a plurality of native design elements; and wherein generating the descriptive format representation of the digital design includes converting two or more native design elements into corresponding descriptive design elements.

14. The computer implemented method of claim 13, wherein generating the descriptive format representation of the digital design further includes omitting one or more other native design elements, of the plurality of native design elements, from conversion into corresponding descriptive design elements.

15. The computer implemented method of claim 1, wherein the descriptive edit action is in respect of a descriptive attribute value; and wherein converting the descriptive edit action into the native edit action further includes:

generating a native value component based on the descriptive attribute value.

16. The computer implemented method of claim 15, wherein the descriptive attribute value includes a text content value or a numerical value; and wherein converting the descriptive edit action into the native edit action further includes:

extracting the descriptive attribute value from the descriptive edit action; and storing the extracted descriptive attribute value as a corresponding native value component.

17. The computer implemented method of claim 16, wherein the descriptive attribute value includes a textual description for an asset; wherein converting the descriptive edit action into the native edit action further includes:

retrieving the asset based on the textual description; and storing an asset identifier identifying the asset as a corresponding native value component.

18. A computer processing system including:

a processing unit;

a communication interface; and a non-transitory computer-readable storage medium storing instructions, which when executed by the processing unit, cause the processing unit to:

receive a natural language request to edit a digital design in a design application, the digital design including one or more individual existing design elements, wherein editing the digital design includes adding a design element to the digital design, or deleting or modifying an existing design element in the digital design;

access a native format representation of the digital design, the native format representation including a native design element corresponding to the existing design element;

generate a descriptive format representation of the digital design by converting the native design element into a descriptive design element;

generate a descriptive edit action based on the request and the descriptive format representation of the digital design, wherein the descriptive edit action is a textual descriptive representation of an edit action natively supported by the design application and wherein the descriptive edit action includes:

a descriptive action component in respect of the descriptive design element or a new descriptive design element;

a descriptive element ID in respect of the descriptive design element or the new descriptive design element; and a descriptive attribute component in respect of the descriptive design element or the new descriptive design element;

convert the edit action into a native edit action suitable for executing in the design application, wherein converting the descriptive edit action into the native edit action includes:

identifying the descriptive action component in the descriptive edit action and generating a native action component, in respect of a corresponding native design element, based on the descriptive action component;

identifying the descriptive element ID and generating a native element ID, in respect of the corresponding native design element, based on the descriptive element ID; and identifying the descriptive attribute component and generating a native attribute component, in respect of the corresponding native design element, based on the descriptive attribute component; and execute the native edit action, in the design application, to edit the digital design.

19. The computer processing system of claim 18, wherein generating the descriptive edit action includes:

providing the descriptive format representation of the digital design to a large language model (LLM);

receiving, from the LLM, an edit description; and storing the edit description as the descriptive edit action.

20. A non-transitory storage medium storing instructions executable by a processing unit to cause the processing unit to:

receive a natural language request to edit a digital design in a design application, the digital design including one or more individual existing design elements, wherein editing the digital design includes adding a design elements to the digital design, or deleting or modifying an existing design elements in the digital design;

access a native format representation of the digital design, the native format representation including a native design elements corresponding to the existing design elements;

generate a descriptive format representation of the digital design by converting the native design elements into a descriptive design element;

generate a descriptive edit action based on the request and the descriptive format representation of the digital design, wherein the descriptive edit action is a textual descriptive representation of an edit action natively supported by the design application and wherein the descriptive edit action includes:

a descriptive action component in respect of the descriptive design element or a new descriptive design element;

a descriptive element ID in respect of the descriptive design element or the new descriptive design element; and a descriptive attribute component in respect of the descriptive design element or the new descriptive design element;

convert the descriptive edit action into a native edit action suitable for executing in the design application, wherein converting the descriptive edit action into the native edit action includes:

identifying the descriptive action component in the descriptive edit action and generating a native action component, in respect of a corresponding native design element, based on the descriptive action component;

identifying the descriptive element ID and generating a native element ID, in respect of the corresponding native design element, based on the descriptive element ID; and identifying the descriptive attribute component and generating a native attribute component, in respect of the corresponding native design element, based on the descriptive attribute component; and execute the native edit action, in the design application, to edit the digital design.

* * * * *